United States Patent
Mallard et al.

(10) Patent No.: US 11,389,699 B2
(45) Date of Patent: Jul. 19, 2022

(54) SMARTER USER HANDLES FOR EXERCISE MACHINE

(71) Applicant: Tonal Systems, Inc., San Francisco, CA (US)

(72) Inventors: David Mallard, Mill Valley, CA (US); Ryan Lafrance, San Francisco, CA (US); David Jonathan Zimmer, San Francisco, CA (US)

(73) Assignee: Tonal Systems, Inc., San Francisco, CA (US)

( * ) Notice: Subject to any disclaimer, the term of this patent is extended or adjusted under 35 U.S.C. 154(b) by 0 days.

(21) Appl. No.: 17/386,293

(22) Filed: Jul. 27, 2021

(65) Prior Publication Data

US 2022/0032115 A1 Feb. 3, 2022

Related U.S. Application Data

(60) Provisional application No. 63/057,846, filed on Jul. 28, 2020.

(51) Int. Cl.
| A63B 24/00 | (2006.01) |
| A63B 71/06 | (2006.01) |
| A63B 21/00 | (2006.01) |
| H04W 4/38 | (2018.01) |
| A63B 23/035 | (2006.01) |
| A63B 21/005 | (2006.01) |

(52) U.S. Cl.
CPC .... *A63B 24/0087* (2013.01); *A63B 21/00058* (2013.01); *A63B 23/03508* (2013.01); *A63B 24/0062* (2013.01); *A63B 71/0619* (2013.01); *H04W 4/38* (2018.02); *A63B 21/005* (2013.01); *A63B 21/4033* (2015.10); *A63B 21/4035* (2015.10); *A63B 2024/0065* (2013.01); *A63B 2071/0655* (2013.01); *A63B 2225/15* (2013.01); *A63B 2225/50* (2013.01)

(58) Field of Classification Search
CPC .............. A63B 21/4035; A63B 21/005; A63B 24/0087; A63B 2225/15; A63B 2225/50
See application file for complete search history.

(56) References Cited

U.S. PATENT DOCUMENTS

| 4,323,237 | A | 4/1982 | Jungerwirth |
| 4,647,038 | A | 3/1987 | Noffsinger |
| 4,772,015 | A | 9/1988 | Carlson |
| 5,271,416 | A | 12/1993 | Lepley |
| 5,910,070 | A | 6/1999 | Henry |
| 6,028,593 | A | 2/2000 | Rosenberg |
| 6,210,348 | B1 | 4/2001 | Reed |
| 6,280,361 | B1 | 8/2001 | Harvey |
| 6,902,513 | B1 | 6/2005 | McClure |
| 6,997,852 | B2 | 2/2006 | Watterson |
| 7,278,958 | B2 | 10/2007 | Morgan |

(Continued)

FOREIGN PATENT DOCUMENTS

| EP | 3202465 | 8/2017 |
| WO | 2017133823 | 8/2017 |

*Primary Examiner* — Sundhara M Ganesan
(74) *Attorney, Agent, or Firm* — Van Pelt, Yi & James LLP

(57) ABSTRACT

In response to physical connection of an exercise accessory with a portion of an exercise machine, an identifier of the portion of the exercise machine is received. A signal including the identifier of the portion of the exercise machine is transmitted.

9 Claims, 26 Drawing Sheets

(56) References Cited

U.S. PATENT DOCUMENTS

| | | |
|---|---|---|
| 7,967,728 B2 | 6/2011 | Zavadsky |
| 8,727,946 B2 | 5/2014 | Greenhill |
| 8,852,062 B2 | 10/2014 | Dorsay |
| 8,876,604 B2 | 11/2014 | Casino |
| 8,900,099 B1 | 12/2014 | Boyette |
| 9,861,856 B1 | 1/2018 | Miller |
| 10,188,890 B2 | 1/2019 | Olson |
| 10,307,641 B2 | 6/2019 | Orfield |
| 10,376,732 B2* | 8/2019 | Garsdean .............. A63B 21/025 |
| 10,486,015 B2 | 11/2019 | Valente |
| 10,661,112 B2 | 5/2020 | Orady |
| 10,751,559 B2 | 8/2020 | Constanza |
| 11,058,917 B1 | 7/2021 | Hutt |
| 2002/0077224 A1 | 6/2002 | Slawinski |
| 2004/0235593 A1 | 11/2004 | Duflon |
| 2006/0229163 A1* | 10/2006 | Waters .................... A63F 13/65 482/8 |
| 2008/0119763 A1 | 5/2008 | Wiener |
| 2008/0318740 A1 | 12/2008 | Ross |
| 2010/0125026 A1* | 5/2010 | Zavadsky ................. A63F 9/24 482/5 |
| 2010/0137114 A1 | 6/2010 | Keiser |
| 2011/0152045 A1* | 6/2011 | Horne ................ A63B 24/0062 482/131 |
| 2011/0165996 A1 | 7/2011 | Paulus |
| 2012/0015784 A1* | 1/2012 | Reed .................... A63B 21/055 482/131 |
| 2014/0038777 A1 | 2/2014 | Bird |
| 2014/0142864 A1* | 5/2014 | Spears .................. A61B 5/1112 702/19 |
| 2014/0194250 A1 | 7/2014 | Reich |
| 2014/0213414 A1 | 7/2014 | Balandis |
| 2014/0221164 A1* | 8/2014 | Siniora .............. A63B 71/0622 482/46 |
| 2014/0296750 A1 | 10/2014 | Einav |
| 2015/0081057 A1* | 3/2015 | Hamada ............. A63B 21/0726 700/91 |
| 2015/0190675 A1* | 7/2015 | Silagy .................... A63B 23/16 482/47 |
| 2015/0290512 A1 | 10/2015 | Montgomery |
| 2015/0296020 A1* | 10/2015 | Granqvist ............... H04L 67/06 455/41.2 |
| 2015/0367162 A1 | 12/2015 | Mueller |
| 2016/0101320 A1* | 4/2016 | Tsutsui ............... A63B 21/0722 482/8 |
| 2016/0146643 A1* | 5/2016 | Martin .................... G01C 19/00 473/223 |
| 2016/0158603 A1* | 6/2016 | Darwood ........... A63B 21/0058 482/5 |
| 2016/0310789 A1* | 10/2016 | Emerson ............ A63B 24/0062 |
| 2016/0325141 A1 | 11/2016 | Wu |
| 2016/0332019 A1* | 11/2016 | Rollins .............. A63B 23/0355 |
| 2016/0375292 A1 | 12/2016 | Taft |
| 2017/0014669 A1 | 1/2017 | Hall |
| 2017/0036063 A1* | 2/2017 | Goldston ............. A63B 21/025 |
| 2017/0203143 A1 | 7/2017 | Ferlito |
| 2017/0234706 A1* | 8/2017 | Martin ................... G06F 3/0346 29/407.05 |
| 2017/0246507 A1* | 8/2017 | Kennington ....... A63B 23/1209 |
| 2017/0304679 A1 | 10/2017 | Orfield |
| 2017/0319931 A1* | 11/2017 | Yachin ............... G09B 19/0038 |
| 2017/0368413 A1* | 12/2017 | Shavit ................ G06K 9/00342 |
| 2018/0015319 A1* | 1/2018 | Lagree ............... A63B 21/0442 |
| 2018/0021614 A1 | 1/2018 | Taft |
| 2018/0021629 A1* | 1/2018 | DeLuca ............. A63B 24/0059 482/4 |
| 2018/0117432 A1 | 5/2018 | Aliberti |
| 2018/0188850 A1 | 7/2018 | Heath |
| 2018/0214730 A1 | 8/2018 | Larose |
| 2018/0243600 A1 | 8/2018 | Kennington |
| 2018/0285496 A1* | 10/2018 | Le Chevalier ........ G06F 16/735 |
| 2019/0091511 A1* | 3/2019 | Christoforou ......... A61F 13/105 |
| 2019/0159714 A1 | 5/2019 | Nagasu |
| 2019/0175092 A1 | 6/2019 | Gold |
| 2019/0269967 A1* | 9/2019 | Thomas ............. A63B 24/0062 |
| 2019/0290962 A1* | 9/2019 | Osbrink ............. A63B 24/0087 |
| 2019/0299049 A1 | 10/2019 | Parsian |
| 2019/0344123 A1 | 11/2019 | Rubin |
| 2020/0047027 A1 | 2/2020 | Ward |
| 2020/0047030 A1 | 2/2020 | Ward |
| 2020/0047053 A1 | 2/2020 | Ward |
| 2020/0047054 A1 | 2/2020 | Ward |
| 2020/0047055 A1 | 2/2020 | Ward |
| 2020/0054914 A1 | 2/2020 | Lafrance |
| 2020/0054929 A1 | 2/2020 | Ward |
| 2020/0222760 A1 | 7/2020 | Padgett |
| 2020/0289890 A1* | 9/2020 | Kim ....................... G16H 40/67 |
| 2020/0316424 A1 | 10/2020 | Orady |
| 2021/0063256 A1 | 3/2021 | Davis |
| 2021/0187339 A1* | 6/2021 | Miller .............. A63B 21/00185 |
| 2021/0244995 A1* | 8/2021 | Andrei ................. A63B 21/225 |

* cited by examiner

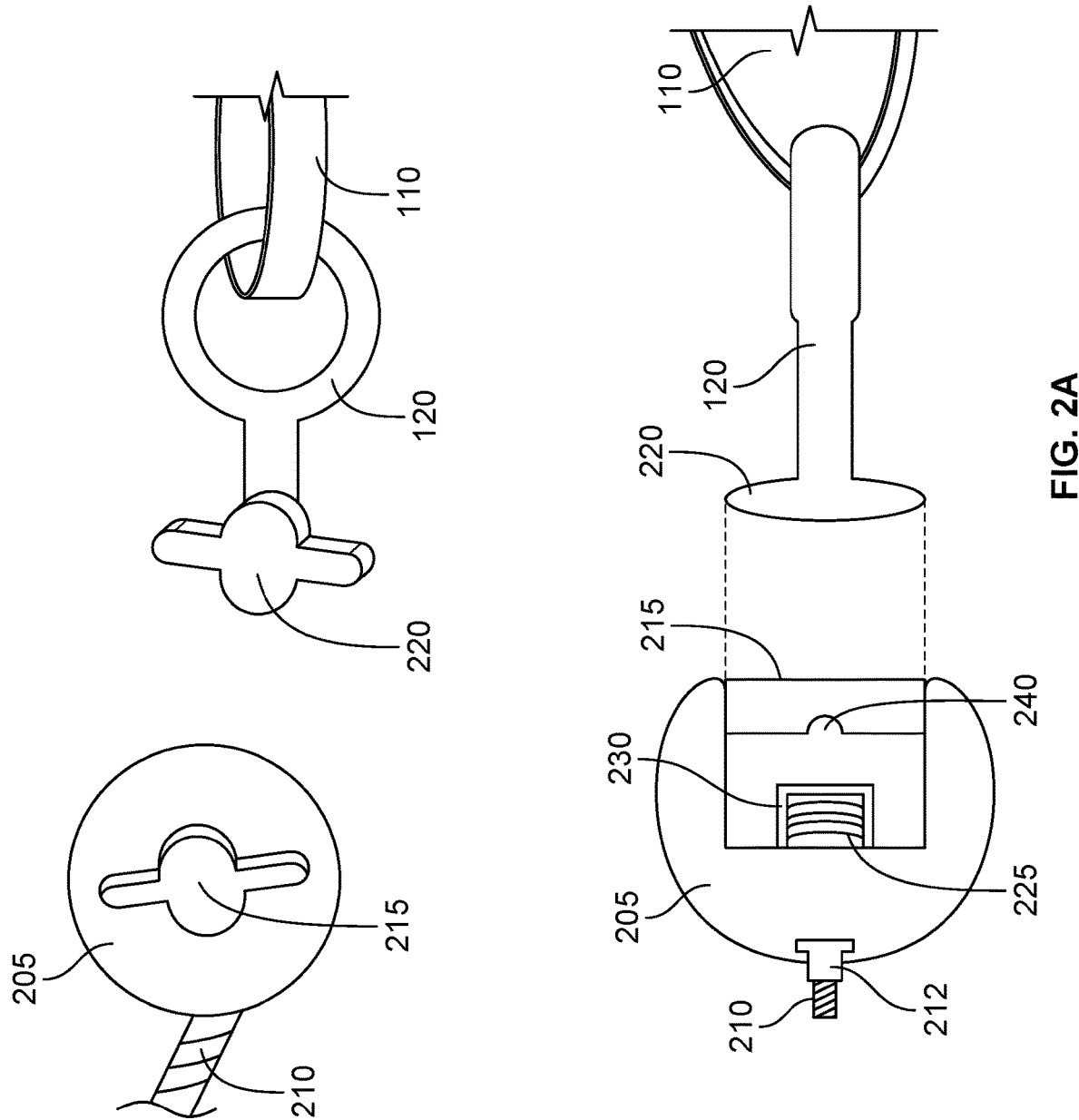

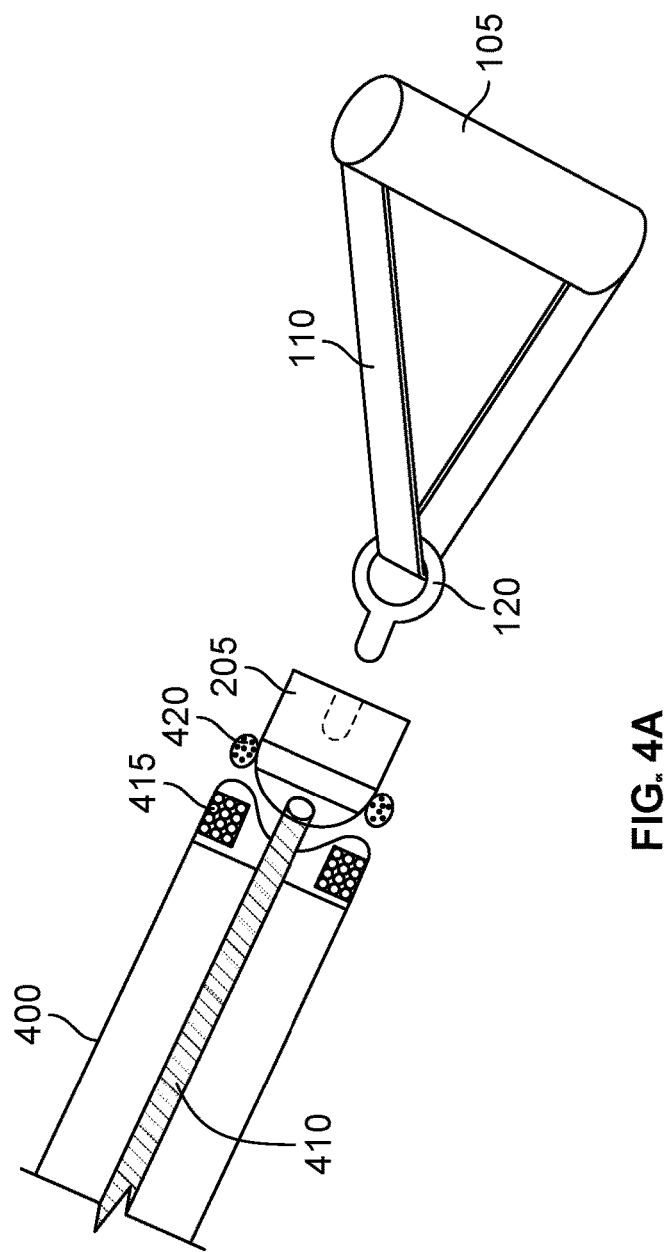
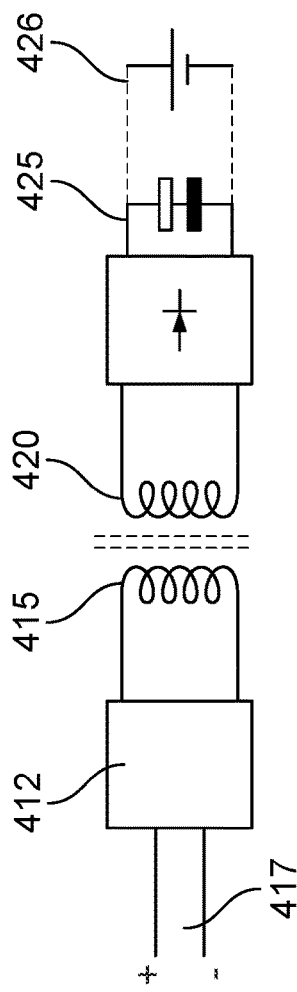
FIG. 4A
FIG. 4B

| Handle Haptics | Pattern in Code |
|---|---|
| 1 buzz at btn down, 1 long, 3 buzzs in quick succession | lra vibe 100 0 300 |
| 1 buzz at btn down, 2 buzzs in quick succession | lra vibe 100 0 50 40 100 |
| | |
| 1 buzz at btn down initiating ramp upward, 1 buzz weight is set | lra vibe 100 0 100 + lra vibe 100 0 100 |
| 1 buzz at btn down, 1 weight is off | lra vibe 100 0 50 40 100 |

FIG. 10

SMARTER USER HANDLES FOR EXERCISE MACHINE

CROSS REFERENCE TO OTHER APPLICATIONS

This application claims priority to U.S. Provisional Patent Application No. 63/057,846 entitled SMARTER USER HANDLES FOR EXERCISE MACHINE filed Jul. 28, 2020 which is incorporated herein by reference for all purposes.

BACKGROUND OF THE INVENTION

Interacting with exercise machines can be challenging, as issuing commands or changing exercise settings can disrupt a user's workout routine and be difficult to perform while performing an exercise movement.

BRIEF DESCRIPTION OF THE DRAWINGS

Various embodiments of the invention are disclosed in the following detailed description and the accompanying drawings.

FIG. 2A illustrates an embodiment of an arrangement of a coupling mechanism.

FIG. 4A illustrates an embodiment of inductive charging.

FIG. 4B illustrates an embodiment of a schematic for inductive charging.

FIG. 10 illustrates an embodiment of a haptic vibration command structure.

DETAILED DESCRIPTION

Figure 1:
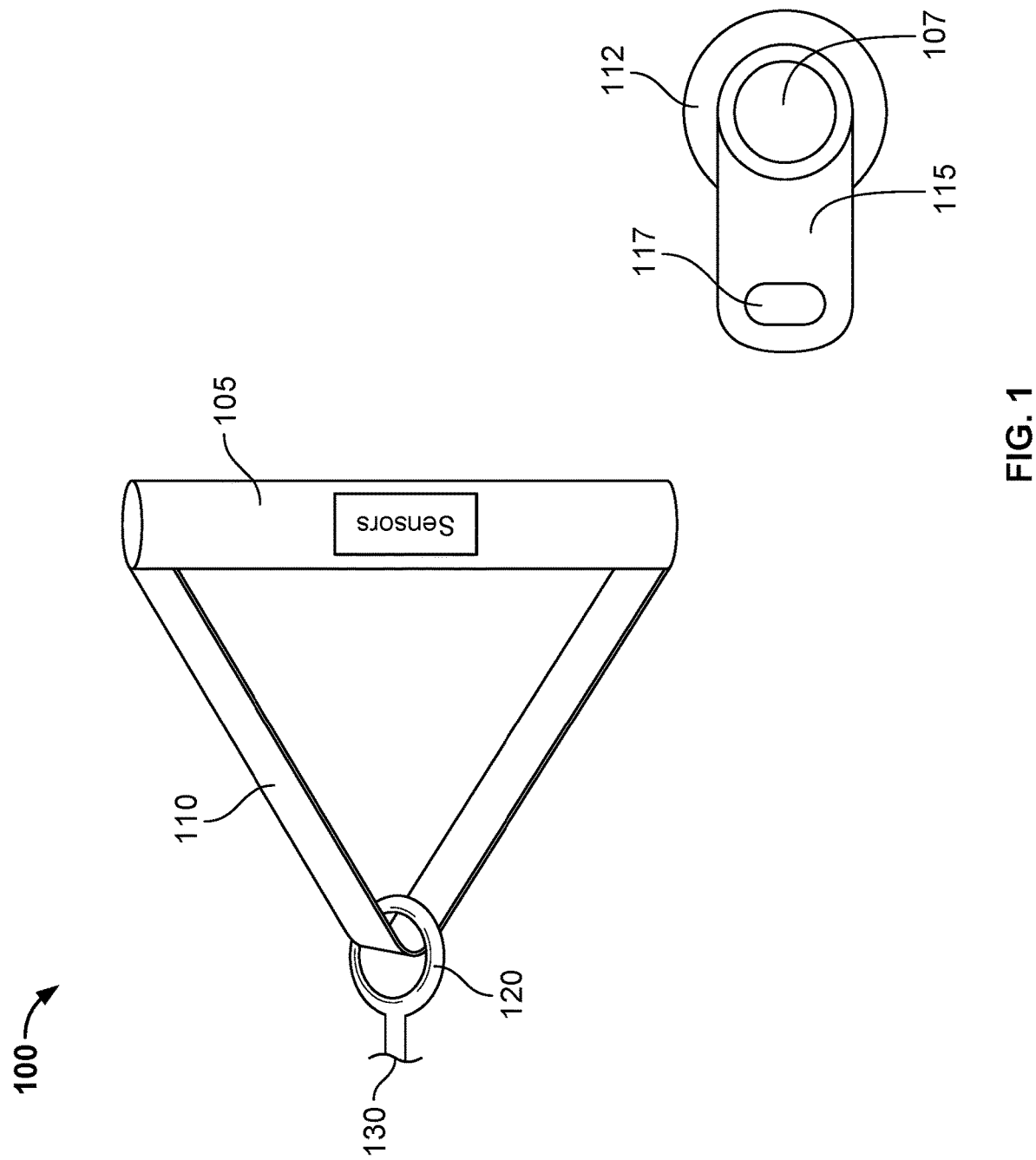
FIG. 1 illustrates an embodiment of a handle assembly.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Exercise machines may fall into two basic categories: simple appliances that provide working resistance to exercise effort, and those which offer sophisticated control that alter their interaction with the user according to some predetermined schedule. A significant benefit of having a machine or appliance that is able to interact with the user is that guidance and motivation may be offered independently of the surrounding environment. Because personalization may be offered in the way of supporting services such as coaching, the tedium of solo exercise may be greatly alleviated and many of the human social cues may be replicated so as to encourage the user's engagement with a structured exercise plan.

One key to a good quality exercise regime is continuity in the exercises as well as a focus on the activity on hand. Distractions from the focused routine are intrusive, and even small, seemingly minor distractions may lead to reduced benefit and injuries from wrongly applied muscular forces or poor positioning. External distractions such as alerts from personal communications devices or even sudden extraneous noise are well understood, but a more insidious problem is the result of user interaction with the more sophisticated interactive exercise appliances.

Most interaction with sophisticated exercise appliances occurs at the display screen or a control panel adjacent to the display screen. Even simpler appliances may have at least a volume control for a music channel along with some selection mechanism to aid in choosing the audio track or channel. In interactive exercise appliances, for example, with the Tonal™ exercise machine and/or Peloton™ bicycle machine, interaction with the user interface may occur, and this entails, for example, either pausing the routine or distorting the exercise position or motion. Such alteration is deleterious to the exercise and there exists a need to avoid pausing an exercise, or else to minimize such distortion by integrating the control actions more closely with the normal use of the machine.

Described herein are techniques for facilitating user control whilst avoiding the need to alter or release the appliance from the user's grip in a way that significantly disrupts the exercise routine.

The following is an example of an exercise appliance usable with the control techniques described herein. For illustrative purposes, techniques for controlling a digital strength trainer are described. In some embodiments, a digital strength trainer uses electricity to generate tension/resistance. Examples of electronic resistance (also referred to herein as "digital weight") include using an electromagnetic field to generate tension/resistance, using an electronic motor to generate tension/resistance, and using a three-phase brushless direct-current (BLDC) motor to generate tension/resistance. The exercise appliance control techniques described herein may be variously adapted to accommodate other types of exercise appliances, as appropriate.

In some embodiments, the digital strength trainer passes a load/resistance against which the user exercises, via one or more lines or cables, to an actuator such as a handle that a user displaces in order to exercise. In some embodiments, the digital strength trainer includes one or more load arms. FIG. 6B illustrates an embodiment of an exercise machine with two load arms. A handle is positioned relative to the user using a load arm, and the load path to the user is steered using pulleys at the load arm ends. In some embodiments, the load arms are adjustable, and may each be pivoted vertically and/or horizontally. In some embodiments, the load arm is connected to the exercise appliance frame using a carriage that moves within a track that is affixed to the main part of the frame. For example, the track is vertical in its orientation, and the carriage allows the load arm to be translated up and down, vertically. In some embodiments, the frame is firmly attached to a rigid structure. For example, the frame may be attached to a wall or other structure such as a gantry. The orientation and position of the appliance may be alterable and determined by the target exercise set or user needs.

In some embodiments, the exercise appliance includes a controller, which monitors and measures user performance as well as determines loads that are to be applied to the user's efforts. In some embodiments, the controller is further coupled to a display that allows instructional information to be presented to the user and with which a user interacts. As one example, the display is embedded in the frame. The display may be in a portrait or landscape orientation. In some embodiments, the display is a touchscreen. To reduce the interference with an exercise routine that occurs whenever a user interacts with the appliance features or controls (which typically are performed by releasing one of the handles in order to use the now free hand to modify settings selected from options indicated at the display, or else by moving physical controls located at the control panel, often proximate to the display), controls are incorporated in the handle. By suitable location of the user controls and careful application of control context information as described herein, the user is enabled to alter the appliance settings without undue pause.

In some embodiments, the exercise machine modulates the tension in a cable to provide the resistance against which a user works to perform the exercise. The cable may be allowed to extend and retract to provide motion for the user, or it may be held stationary to provide a static resistance for the user that exactly balances the muscle effort without significant motion. Amongst features that the exercise machine provides are interactive instruction with both audio and/or video components, as well as separate provision for audio content that may be of a different type. Examples of such audio content include background music with a tempo or beat that is used to support the maintenance of an exercise rhythm, or content that is used purely for entertainment, such as a podcast or user-defined content. The volume or loudness of the content may depend upon the user and the environment, and controls are provided to a user to alter the volume or mute it. Similarly, if a tempo is relayed to the user, controls are provided for the user to alter the tempo to match the user's preferences, abilities, and/or comfort.

One aspect of the exercise machine described herein is the ability to have a dedicated set of handles that may be personal to the user. In one embodiment, a user account is associated with an exercise accessory such that when the user's personal accessories are connected, they are auto-logged in and/or their preferences are loaded automatically. In some embodiments, these handles are engaged with a locking apparatus that connects them to the cable system of the exercise machine. The ability to select handles has its origins in being able to personalize the deadweight of the user coupling point so that users having low strength, such as an elderly or rehabilitation user, may exercise against the machine without needing much threshold strength just to hold the handles against gravity. Handles of this type are typically made of a lightweight composite material such as carbon fiber reinforced polyester or epoxy resin that allows strength without the penalty of mass. The opposite end of this consideration is that a handle may be made massive so as to replicate the momentum effects experienced by a power lifter. Characteristically, this may be done using a high density material such as Tungsten embedded in a composite outer structure. Further, the hygiene aspect is much improved when a user has a dedicated handle that is not shared with others. To this end, a robust coupling system is provided that allows rapid connection of a handle.

In some embodiments, a user profile is communicated to an exercise appliance. This allows a user that travels extensively to maintain his or her exercise regime even when different exercise appliances are used; for example, if a user discovers a similar machine in the exercise room of a hotel then, assuming the machine is adequately provisioned, this user may continue with their exercise regimen as if they were at their home location.

FIG. 1 illustrates an embodiment of a handle assembly. Referring to the example of FIG. 1, a handle assembly 100 is illustrated. In this example, the user holds the rigid part 105 in the hand, and this rigid part 105 is coupled to a flexible strap 110. The strap 110 passes through a coupling component 120 that terminates in a connection 130, which matches a coupling element shown in the example of FIG. 2A. In various embodiments, the rigid element 107 is implemented as a bar or tube construction that is surrounded by a compliant covering 112 to prevent the development of hot spots, or pressure points, for the user's hand. In this example, the flexible strap 110 is attached to the rigid part 107 of the handle by a clip assembly 115 that permits the rigid part 107 to rotate freely for at least some of its travel within the clip assembly 115. In some embodiments, a slot or opening 117 is provided in the clip to facilitate attachment of the strap 110. In the example of FIG. 1, a ring is shown as the attachment to the coupling component 120. Other openings may be used that allow the strap 110 to move freely so that angular positioning of the handle may accommodate the physical geometry of the user's wrist positioning.

FIG. 2A illustrates an embodiment of a coupling system that allows attachment of handle assembly 100 of FIG. 1. In this example, strap 110 passes through the opening of the coupling component 120, which is terminated in a T-shaped end 220 (also referred to herein as a "T-lock"). In this case, two "ears" protrude radially from the shaft of the coupling component 120, and are sized so as to engage in a matching receiving cut out 215 in a coupling element 205 that is attached to a cable 210 which is tensioned as needed by the exercise appliance. In some embodiments, a retaining clip 212 is swaged onto the cable 210 to connect it to the coupling element 205. A user engages the T-shaped end with the receiving cut-out, pushes in and twists to provide a locking action. The example view illustrates the T-shape 220, and within the coupling element 205 is a spring 230 and a cup washer 225 that exerts a force to eject the T-shape in the entry/release position, which, when the coupling component 120 is rotated approximately 90°, forces the T-shape pegs into a pair of detents 240 so as to prevent accidental release. Coupling the handle in this configuration requires both hands since a push and twist operation is not resisted by cable connection, and a mechanism to prevent this when the cable is fully retracted has a potential disadvantage that it may wear or jam, potentially leading to a longer term maintenance problem.

Figure 2B:
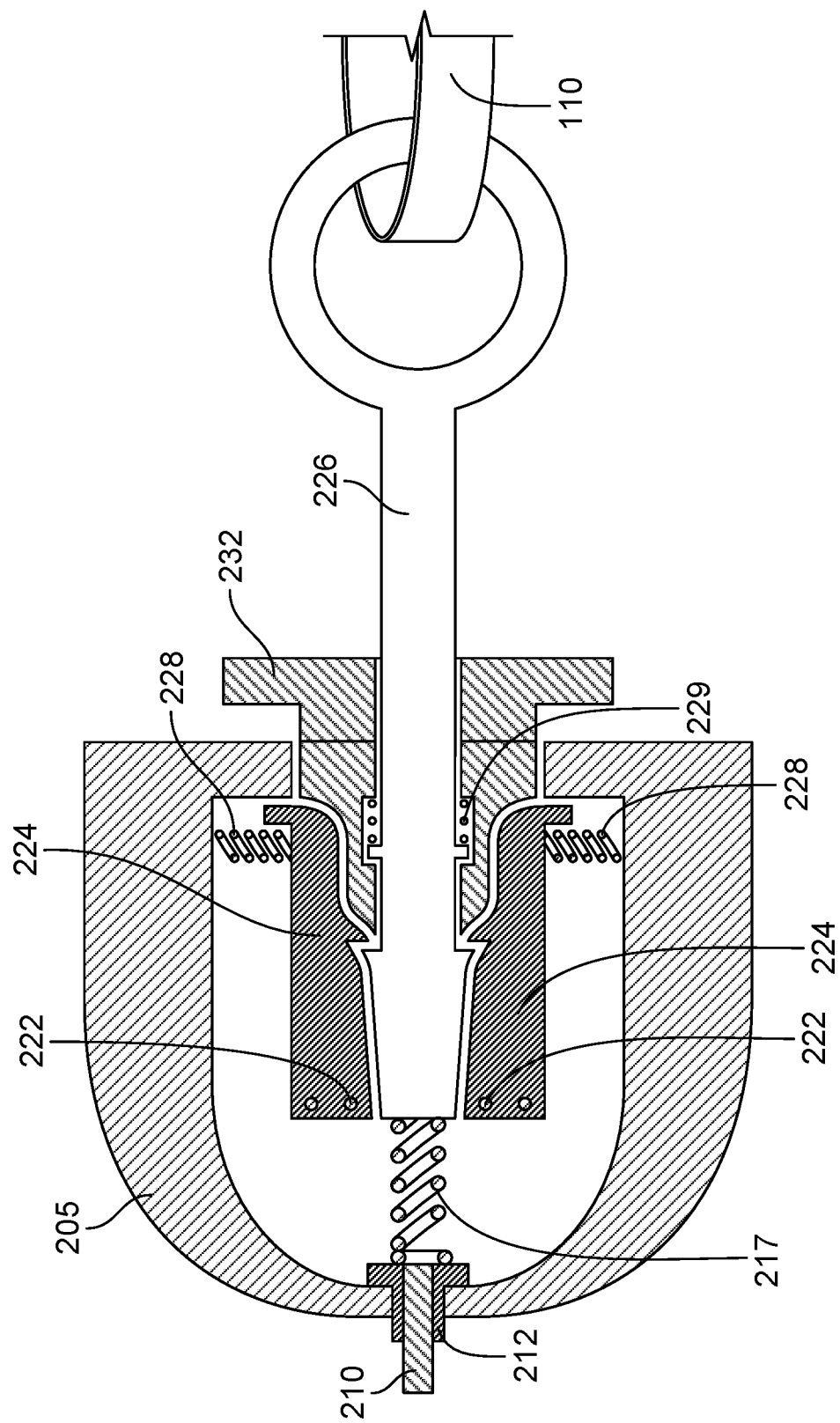
FIG. 2B illustrates an embodiment of a single-handed coupling device.

FIG. 2B illustrates an embodiment of a mechanism that allows for single-handed operation of the coupling mechanism. Instead of requiring the user to push and twist to engage the smart handle with the coupling 205, which is generally a two handed operation because the cable 210 with its associated swaged end-piece 212 is not rigid in torsion (and neither is its connection to the coupling 205), the coupling action relies on a positive locking mechanism based on a toothed component. As shown in this example, two toothed components 224 are pivoted on pins 222 that are pressed through the body of coupling 205. In some embodiments, the pivot points are located so that the moment about them of the pull force applied to the teeth of these components are as small as practical to avoid accidental disengagement. These toothed components 224 are held in the locked position by springs 228 which, for example, may be coil springs or hairpin springs that have one end pressing against the body of the coupling 205 and the other against the toothed component 224.

A single-handed connect and disconnect mechanism via magnetic coupling and uncoupling is described herein. In some embodiments, a matching tooth pattern is formed on the coupling shaft 226 that has the flexible strap 110 of the smart handle coupled to it by passing through a suitably sized ring or slot in a similar or same way as shown at component 120 of FIG. 2A. When applied to the coupling component 205, the coupling shaft 226 displaces the toothed components 224 against spring pressure so that it may simply be pushed into engagement. In some embodiments, to reduce the effects of wear, even on hardened components such as the teeth on the shaft 226 and the matching teeth on the toothed components 224, a spring 217 is positioned so as to bias the shaft 226 firmly into engagement with the toothed components 224 so that no play is evident.

Figure 2C:
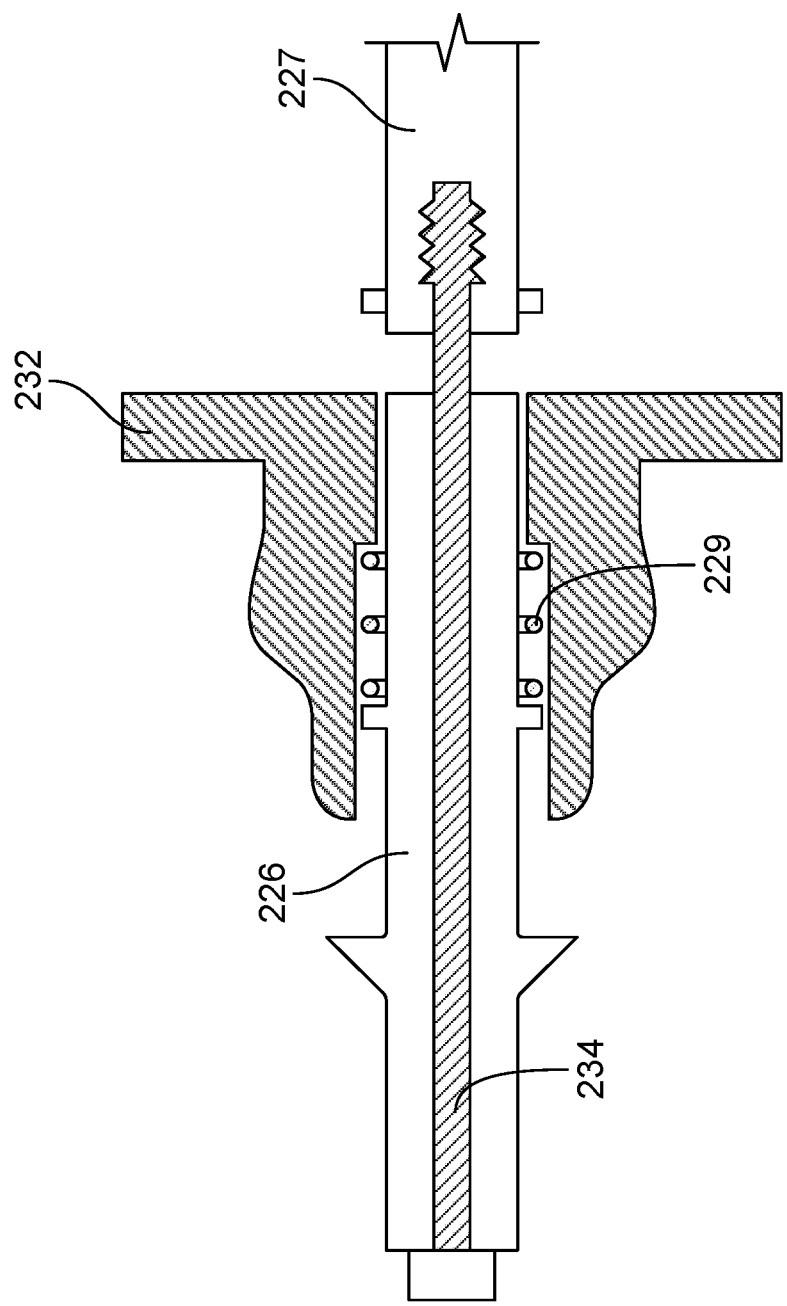
FIG. 2C illustrates an embodiment of a construction for a portion of a coupling shaft.

As shown in this example, a release collar 232 is assembled to the shaft so that it slides freely to the extent of its predetermined travel. In some embodiments, the collar is biased to the disengaged position by a spring 229, and when pressed inwards towards the coupling 205, the collar displaces the toothed components 224 outwards against spring 228 pressure along a ramped section of the collar so as to release the shaft 226 from its engagement with the toothed components 224. Pressure from spring 217 assists with this disengagement. In one embodiment, collar 232 is a split component that is installed on either side of shaft 226, and is held together by locating pins and spring clips. In an alternative embodiment, as illustrated in the example of FIG. 2C, shaft 226-227 is a two-part construction that uses a bolt 234 located axially within the shaft to hold it rigidly as a single part.

Smart Handle

The following are further example details and embodiments regarding smart handles.

One example aspect of a smart handle is the provision of an identifier that is unique to each handle. Without limitation, as referred to herein, a "handle" is a generic accessory that is used to pull a cable, including a one-handed handle, two-handed handle, a bar, a curvy bar, a goblet squat handle, foot strap, foot handle, and/or curl bar. A smart handle provides the functionality described herein, either integrated directly into a hand accessory, or through an add-on such as a bar control module, which, for example, is clipped onto a bar.

While in some embodiments a wire connection is used to transfer energy and information between the smart handle and the exercise appliance, constant operation of the appliance may make the wiring prone to breakage. In one embodiment, an RFID (Radio Frequency Identification Device) is embedded in a part of the handle that is not shielded by the presence of a metal. In some embodiments, the RFID element contains a unique identification number that may be retrieved upon interrogation, which the number is stored, for example, as a long binary sequence of a predetermined number of digits. In some embodiments, RFID allows a trainer such as the digital strength trainer described herein to identify a handle, and/or using NFC (near field communication) technology, bidirectional exchange pairing information may also be used. In one embodiment, Bluetooth and/or BLE (Bluetooth Low Energy) protocol may be used instead of RFID and/or NFC. In one embodiment, a single wire interface is used to obtain the identifier of a "ball stop" that the handle is mating to in order to identify the precise ball stop that is connected. Further details regarding such an interface are described below.

Figure 3:
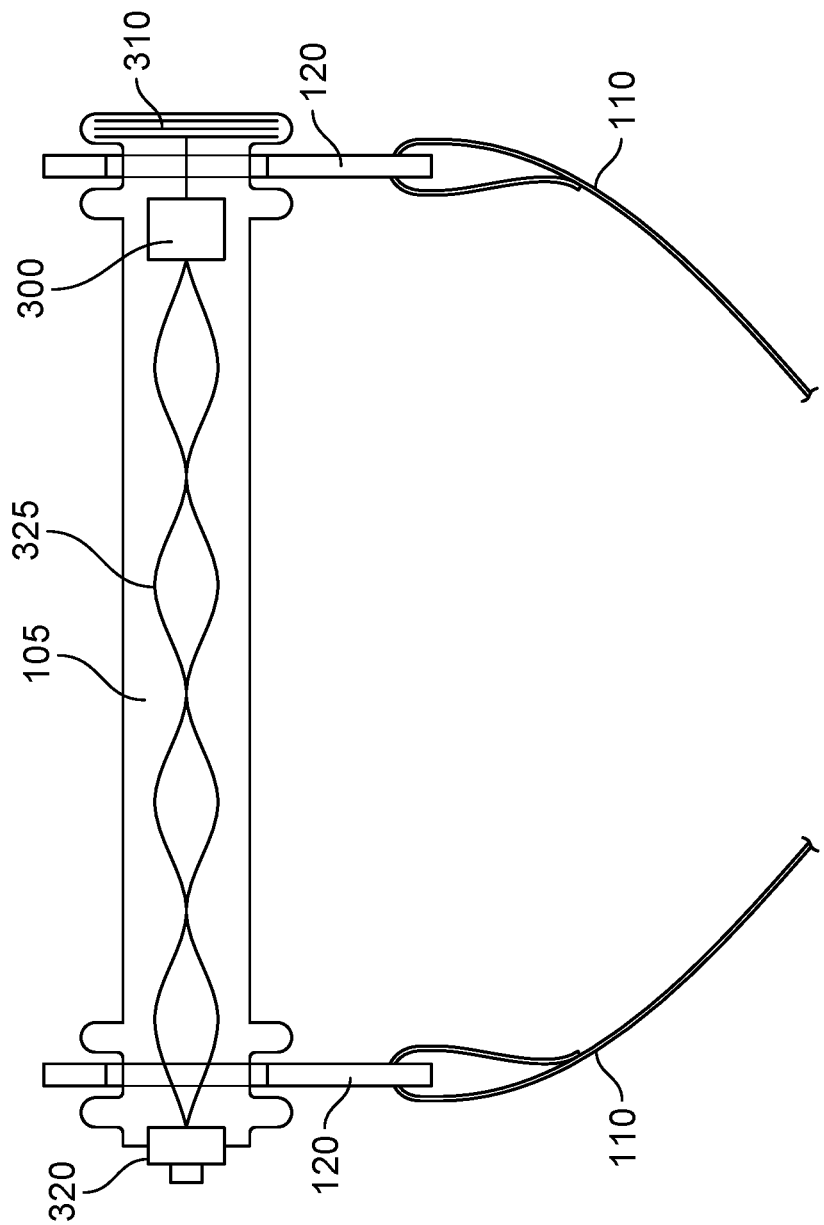
FIG. 3 illustrates an embodiment of embedding RFID in a smart handle.

FIG. 3 illustrates an embodiment of an embedded identification device. In this example, an RFID element 300 is molded into the handle assembly 105 and is connected to an antenna structure 310 that is molded, for example, into a non-conductive plastic material at the end of the handle. The antenna in this embodiment is a coil of insulated wire forming an inductance that is resonated with a predetermined capacitance located, for example, on the same circuit board as the RFID element. One example frequency is 13.56

MHz, which is one of several ISM (Industrial, Scientific and Medical) spectral allocations that are defined under the FCC, Title 47 of the Code of Federal Regulations Chapter 1, subchapter A, Part 15, which addresses intentional radiator and receiver devices that require no individual license for operation.

In operation, an interrogating transmitter-receiver located at the exercise appliance radiates a carrier wave at the selected system frequency. In this example, this signal is received by the resonant system in the smart handle of FIG. 3, which includes the antenna and resonating capacitance and the rectified signal used to charge a storage capacitance. Once the voltage on the capacitor reaches a predetermined threshold, the RFID element responds by sending its binary ID (identifier) sequence to a component that modulates the carrier wave that is then received and decoded by the originating transceiver. In one embodiment, the antenna for the interrogating transceiver is located at the end of the arm that guides the cable that creates the resistance against which the user exercises; in this way, the smart handle is forced into close proximity with the interrogation field at least when the smart handle is connected by the user. In a second embodiment of this identification process, the user is requested to interact before the exercise routine commences. In some embodiments, the user pushes and holds a button 320 that is connected to the RFID component by cableform 325.

In one embodiment, by allowing a small delay between the handle arriving in the radiated field and the identification taking place upon button press, enough energy may be stored to achieve several retransmissions of the identification sequence which makes more certain an accurate receipt of the identification of the smart handle and its related user.

In one embodiment, the handle communicates with the ball stop or the trainer via various wireless mechanisms such as RFID, NFC, and/or BLE, in part to identify a specific handle, or identify a user.

In one embodiment, the coupling component 205 of FIG. 2A is equipped with the RFID interrogation circuitry. In some embodiments, in its idle condition, the coupling component is drawn back to its resting position at the end of the adjustable arm that guides the cable whose tension provides the resistance against which the user exercises; in an exercise machine with two adjustable arms (as shown in the example of FIG. 6B, where arm 400 is an example of an adjustable arm), it is an option to have both coupling components identically provisioned. In some embodiments, power is provided to an inductive charger that couples magnetically to the coupling component when it is in the retracted position. In some embodiments, energy is stored in the coupling component circuits, and because the resting times may be quite long when the exercise appliance is in its resting state, and the coupling component is able to harvest energy from the inductive charger, other functions may be accomplished, with an adequate reserve of power.

FIG. 4A illustrates an embodiment of an inductive charger providing power to the coupling component to which the smart handles may be coupled. In this example, the exercise appliance uses a cable 410 to provide the load against which a user exercises. In some embodiments, the load is provided by a motor or actuator that tensions the cable 410 and the cable is routed to the position selected by the user through an arm 400. For example, the motor provides the electronic "digital" resistance described herein. In some embodiments, the motor is included in the frame of the exercise appliance. In some embodiments, there is a single motor. In other embodiments, there are multiple motors. For example, in some embodiments, each adjustable load arm is associated with a corresponding motor. This allows individual loads to be provided to individual arms. Coupling component 205 is in the retracted position as shown, nested against the end of arm 400. In this example, at the end of arm 400 against which the coupling component 205 rests, a coil 415 is wound that acts, for example, as the primary of a transformer. When energized by an alternating current, an alternating field is produced which is strongest along the axis of the coil. In this example, a second coil 420 is wound at a suitable location on the coupling component 205 so that in the resting position shown in FIG. 4A, the second coil is closely coupled to the magnetic field produced by the primary coil. Currents are induced in this second coil 420 and it acts as the secondary of a transformer structure. By monitoring the current flow in the primary, the amount of energy being transferred to the secondary of the transformer may be determined. Current flowing in the secondary of the transformer may be rectified, and the now pulsating unidirectional or direct current is used to charge a capacitor or a battery located in the coupling component 205.

FIG. 4B illustrates an embodiment of a schematic for inductive charging. In particular, the example of FIG. 4B illustrates the aforementioned action as a block diagram. In this example, a direct current supply 417 is delivered to an inverter 412 that converts it to an alternating voltage. This voltage is applied to the primary winding 415 of the transformer that is formed by coupling the two coils 415 and 420. The coupling efficiency depends on the magnetic properties of the material that runs between the two coils. In some embodiments, the excitation frequency of the inverter is chosen such that when the transformer action is reduced, as the two coils are pulled apart during the exercise period, any tendency for the coil to saturate is kept to a minimum. This may be achieved, for example, by monitoring the energy delivered, and reducing or shutting down the inverter action as required. In one embodiment, the coils are nested in the retracted position so that coil 420 rests almost entirely within coil 415, leading to the best or most optimal coupling between them. In some embodiments, coil 420 is connected to a rectifying circuit and the resulting output voltage is used to charge a storage component. This may be a capacitor or super-capacitor 425, or a rechargeable battery 426. The available energy may then be used to operate a link technology embedded within the coupling component 205 acting as a mediating element having a reliable and defined position relative to the smart handle 105, and having sufficient power to be able to communicate with the main exercise appliance. For example, in some embodiments, a computing device is embedded within the body/frame of the main exercise appliance, where the computing device performs various types of processing. As one example, the computing device is implemented using the Android operating system. Other types of computing devices may be used.

In one embodiment, a communication circuit embedded within the coupling component 205 uses the same coupling transformer that is used to transfer energy, formed by coils 415 and 420, to link information exchanged with the smart handle 105 to the exercise appliance. The data exchanged with the smart handle 105 may be achieved using the RFID technology described above in the case of a purely passive smart handle. In one embodiment, a BLE communications link is used for this data exchange. In one embodiment, an energy harvesting device embedded in the handle is actuated by the act of pressing the button and the power that is harvested is used to send an unacknowledged signal to the trainer.

In one embodiment, once a smart handle is coupled to the exercise machine, a number of additional features may be actuated by the user's manipulation of the handle and one or more switches. In some embodiments, the smart handle is equipped with controls that the user may manipulate, for example, switches or actuators that may be pressed or released to activate functions of the exercise appliance where the switches may be operated either separately or in combination.

Figure 5A:
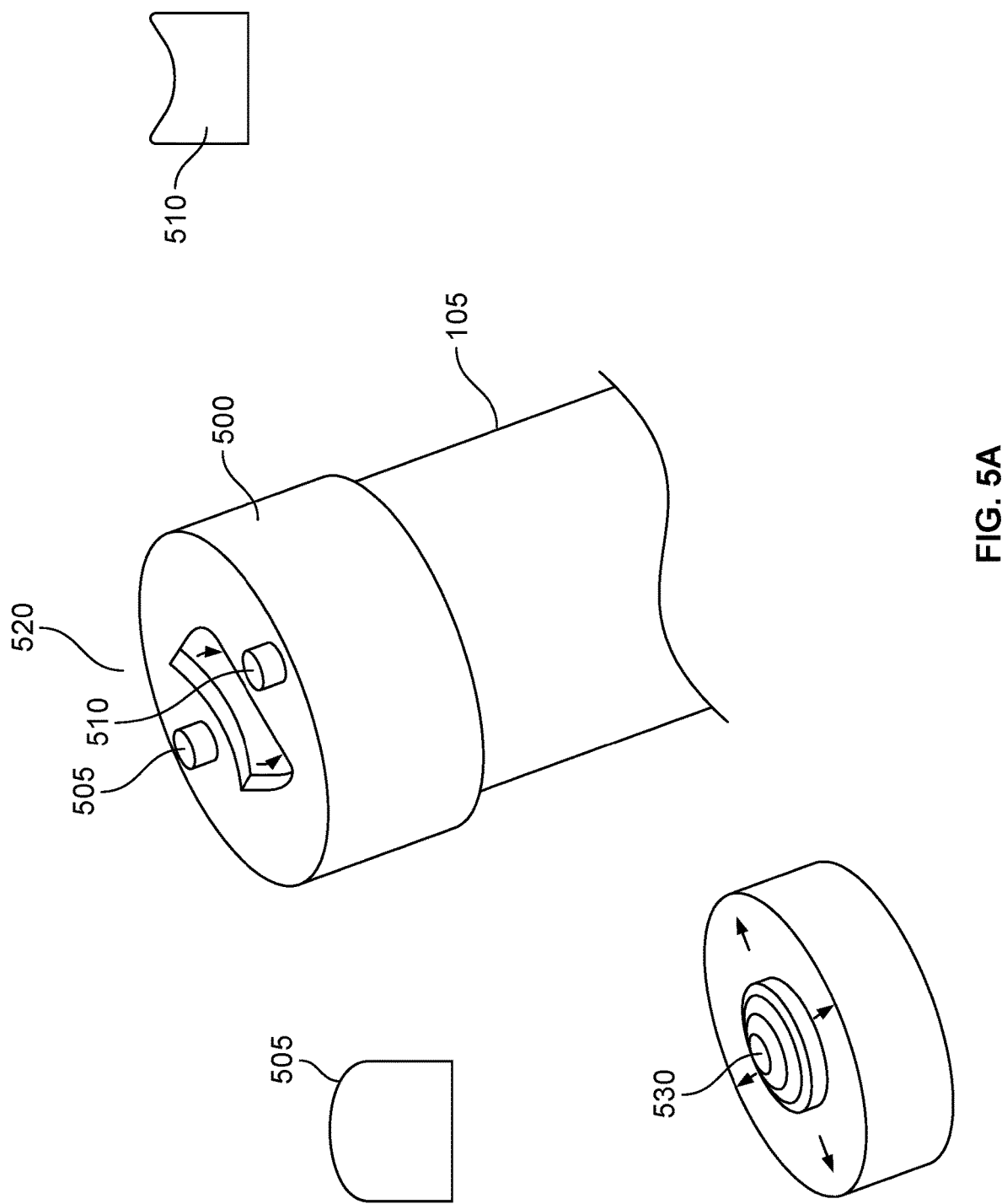
FIG. 5A illustrates an embodiment of switch arrangements inset at one end of a smart handle.

FIG. 5A illustrates an exemplary arrangement of switches installed in one end 500 of a smart handle body. In this example, two button switches 505 and 510 are completely separate parts, and a third switch assembly 520 is a rocker-style switch that is usable for parameters that may be increased or decreased. A variety of ways may be used to identify or detect that the user is interacting with the handle, all of which may be used with various embodiments. Without limitation, any technology that indicates "signal is sent" may be used, including a physical/mechanical switch, capacitive touch, force sensing, LDS/MID, and pressure mapping. Another example type of switch is a ring actuator (also referred to herein as a "button ring" or "button contact ring"), further details of which will be described below.

One feature is that of altering the volume on an audio channel, which includes the following three functions to be accessed: volume up, volume down, and mute. When the acoustic information is in the form of a beat or music, the functions of faster and slower or "next track—last track" may also be of interest to users. In one embodiment the rocker switch 520 is used to increase and decrease the volume, whereas one of the other switches 505 or 510 is used to mute. According to user preference, the action of unmuting may be achieved by operating the rocker switch 520 in either direction or else by pressing the button that was designated as controlling the mute function. In some embodiments, buttons 505 and 510 are distinguished by tactile elements such as a dome or depression, respectively. In another embodiment, a joystick "top-hat" 530 switch assembly incorporates four switches actuated by moving the top-hat in one of four directions, as well as one independent switch operated by depressing the top-hat vertically. Other functions may be manipulated besides audio, for example, turning "on" a digital weight, turning "off" a digital weight, altering a weight, and/or altering a weight when a button is used with an accelerometer.

Figure 5B:
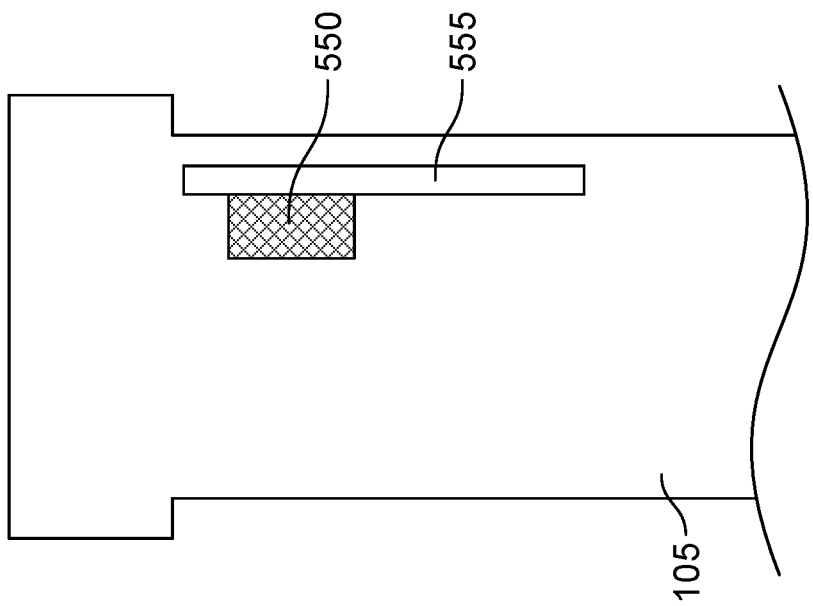
FIG. 5B illustrates an embodiment of an inertia switch and an MEMs component within a smart handle.
Figure 5B:
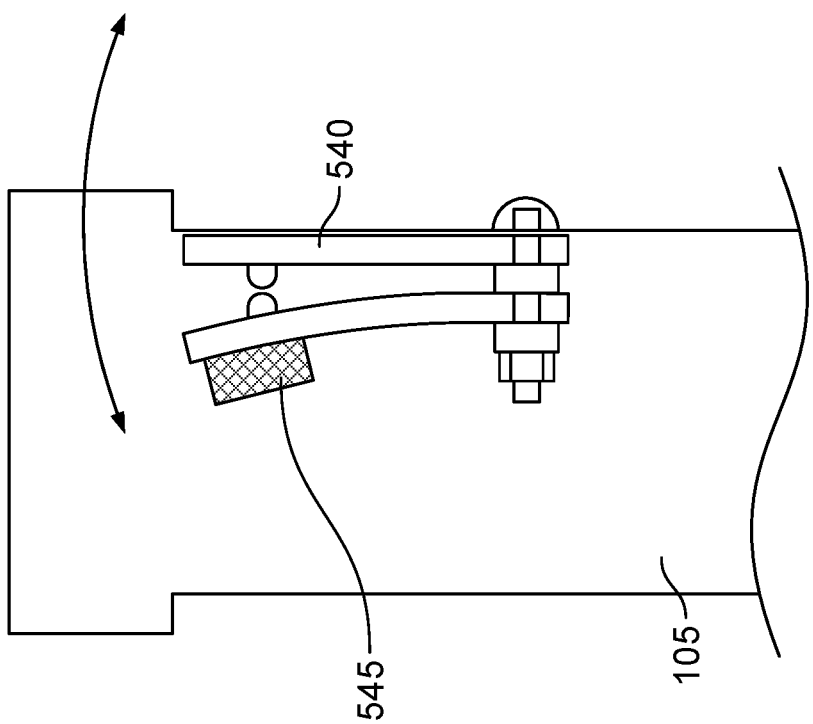

FIG. 5B illustrates an embodiment of an inertia switch and an MEMs (micro-electromechanical system) component within a smart handle. In the example shown in FIG. 5B, the selection mechanism is performed by the use of one or more inertia switches 540 aligned with the axis of the handle and responsive to fore and aft pulse tilting of the smart handle. Here, as shown in this example, a mass 545 is attached to one of the two switch contact elements and a rapid movement causes the handle to move relative to the mass so that contact may be made or broken according to the way that the switch is pre-loaded. Because it is progressively more difficult for a user to apply accurately metered forces as the muscles become tired, inertial systems that are of this construction become more difficult to operate consistently. Micro-electromechanical mechanisms are capable of exceptional resolution, and in another embodiment, MEMs accelerometers are used to sense user actions. In some embodiments, these MEMs devices are packaged in a single integrated enclosure 550 and are fastened to a circuit board 555 which may also include other components such as microprocessors.

In some embodiments, accelerometers (e.g., an inertial measurement unit (IMU) with a gyroscopic and/or accelerometric component) are packaged as a combination of three or more axes of motion, to include rotational as well as linear motion. In this case, complex user motion may be captured and encoded to control many functions of an exercise appliance. In some embodiments, switch state or accelerometer information is communicated to the exercise appliance using one or more of a number of wireless technologies. Feedback to the user may be tactile and/or acoustic, and in some embodiments, a visual indicator may also be used to assure the user that a user event has been recognized. Feedback may also come in the form of altering the weight/speed of the resistance from the trainer. Haptic feedback may also be provided by the handle, as will be described in further detail below. The feedback mechanism may not be a part of the handle at all but distributed in another component and/or server.

The wireless signaling between the smart handle and the exercise appliance may be achieved with an active or passive link. In either case a radiating structure forming an antenna is used, and for optimal performance, these antennas are easily visible to the exercise appliance. In some embodiments, the smart handle antenna system is located proximate to the ends of the handles, being defined by the long axis of the handles.

Figure 6A:
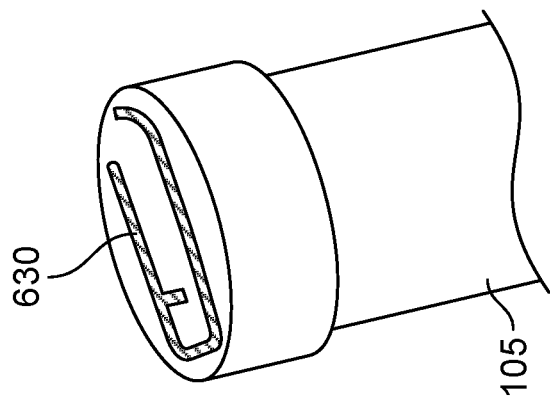
FIG. 6A illustrates an embodiment of an arrangement of antenna components with respect to a smart handle.
Figure 6A:
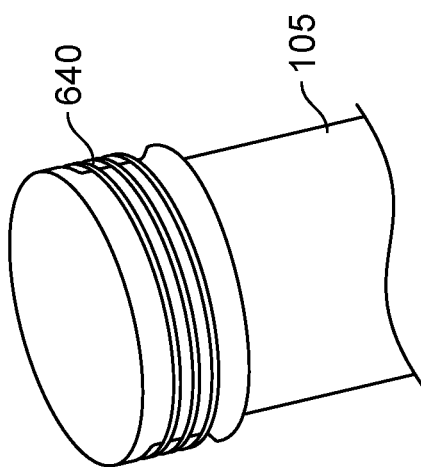
Figure 6A:
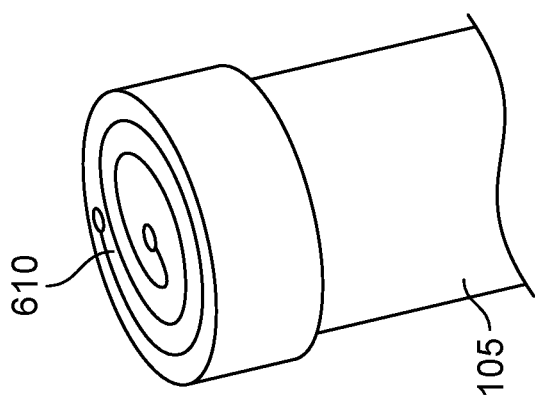
Figure 6B:
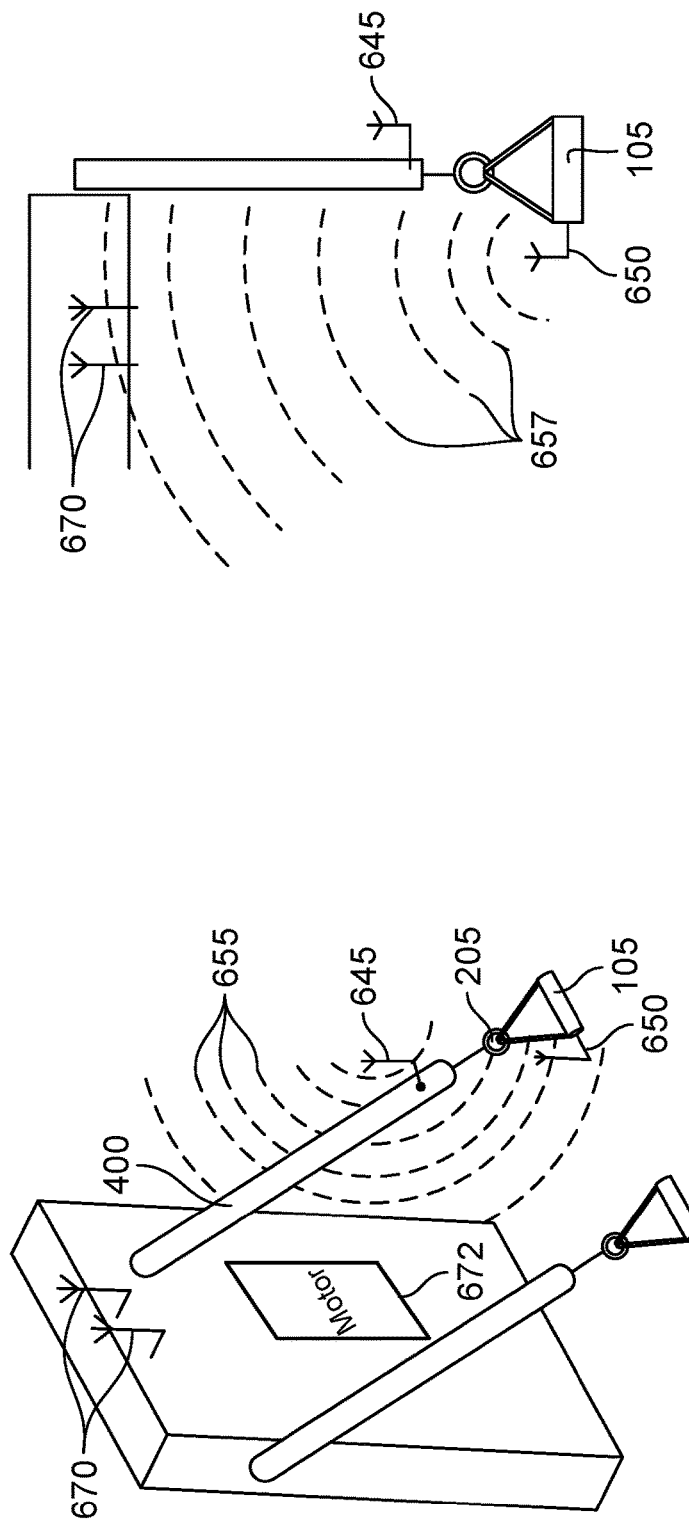
FIG. 6B illustrates an embodiment of a radio frequency arrangement for communicating user commands.
Figure 6B:
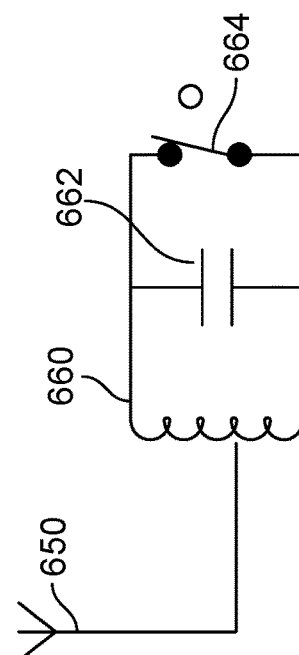

FIG. 6A illustrates an embodiment of how antenna components are attached to the extremities (ends) of the handles. In some embodiments, the antenna that is used is determined by the frequency that may be used, although there may be overlaps between technologies. In some embodiments, for frequencies between about 50 MHz and 500 MHz, an antenna such as a spiral radiator 610 is used that is printed on an FR4 substrate material insert for the end-cap of the smart handle. The shape does not have to be circular (since the primary factor is the ability of the structure to radiate); neither does the antenna need to be exposed, and the antenna may be printed beneath the substrate so that it is hidden and protected from physical damage. For frequencies in the 1,500 MHz range, a printed antenna such as an inverted—F 630 is used. Above this frequency, a ceramic resonator 620 may be used, for example, for WiFi applications; as a physical component this antenna may be assembled onto a carrier board which may also be made of FR4 circuit board material. This type of antenna may be mounted so that it lies beneath the substrate and may be protected from physical damage. For low frequencies, a coil of wire 640 may be wound onto the end assembly, where this may be particularly useful for wireless charging applications as well as communications. The proximity of a metal handle may affect the efficiency of the coil as a radiator, but if a diamagnetic material is used for the handle, such as aluminum, the interference with operation is easily managed; the use of magnetic materials with iron content is avoided due to the loss caused by the induced eddy currents. By changing the length of the spiral antenna 610 and selecting the resonating components, specific frequencies may be chosen so as to match the application intended.

Because antenna systems are subject to effects that interfere with the signals, such as fading or frequency selective fading, either or both ends of a link may be equipped with more than one antenna, and may be aligned so as to have different polarizations between them. Fading, which is the effect of reduced signal strength as a result of the signal travelling by multiple paths and arriving at an antenna out of phase with other paths, is uncorrelated with polarization, and the use of more than one antenna improves the system by significantly reducing the severity of fading, which helps ensure that the link's integrity is maintained at a high level. Since the interaction between user and appliance is digital in form, appropriate coding may also be applied to the information to be passed, so that the multipath errors which are typical of systems that move may be reduced.

FIG. 6B illustrates an embodiment of a system that uses a passive RF system for communicating the user input state of a smart handle. In some embodiments, the exercise appliance is equipped with a radio transmitter coupled to an antenna 645 located at the distal end of arm 400. As described above, the arm 400 routes a cable that is tensioned to provide the exercise load for the user and to which is attached a coupling 205 to which is connected the smart handle 105. The transmitter sends either a continuous wave signal to the antenna 645 or an intermittent continuous wave signal to the antenna 645. In some embodiments, a radio receiver mounted at the exercise appliance coupled with two or more antennas 670 so as to provide a diversity function is located at the appliance. These antennas may be located at any appropriate position; in one embodiment, a receiving antenna is located at the distal end of each of the arms of the exercise appliance, so as to be reasonably close to the smart handles whilst the transmitting antenna is located at the appliance itself. Radio signals from the transmitter and its antenna propagate in a notionally spherical pattern 655 but modified or flattened somewhat, depending on the directional characteristics of the antenna 645. These signals are received by the receiving antennas and are detected to measure the relative signal strength, and although there may be variations according to local movement of objects, this may be fairly slow.

In various embodiments, one or both smart handles have an antenna 650 that is tuned to resonate at the frequency of the transmitter and, because it is also a radiator, may re-radiate this signal, but from a different position in space with a similar pattern 657 to that of antenna 645. This positional difference corresponds to a phase difference as seen from the receiving antenna(s) 670, and therefore as an amplitude difference when the signals are summed. A switch at the smart handle may be used to close a circuit which changes the performance of the antenna 650 and this change in performance may cause a detectable change at the receiving antenna(s) 670.

The example schematic of FIG. 6B illustrates antenna 650 connected to a resonant circuit formed by inductance 660, capacitance 662, and switch 664. When the switch 664 is connected as shown, the resonant frequency of the system is pulled away from that of the transmitter frequency and so re-radiation is minimal, but when the switch 664 is opened then the system is now restored to resonance at the transmitter frequency and significant, detectable re-radiation of the transmitter signal occurs. In one embodiment, the switch 664 is connected so as to select a different frequency that is not far removed from the exciting frequency of the transmitter, and that signal may then be detected by the receiver at the exercise appliance and used to indicate a different switch closure. In one embodiment, the transmitter detects the proximity of antenna 650 to its antenna 645 by observing a loading change that alters the operating current of the transmitter circuit.

In one embodiment, the transmitter signal is switched or swept across a range of frequencies and the frequency of the antenna 650 circuit in the smart handle 105 is selected by a switch closure, which selected frequency causes a detectable change that is received by the exercise appliance receiver and corresponds to a function instruction or command to the exercise appliance.

An active radio system may be used whereby a low power system determines the actuation state of the switches in the smart handle and relays them to a matching transceiver located at the exercise appliance. In some embodiments, the receiver at the exercise appliance decodes the switch state information and uses this information to control predefined parameters at the appliance.

Figure 7:
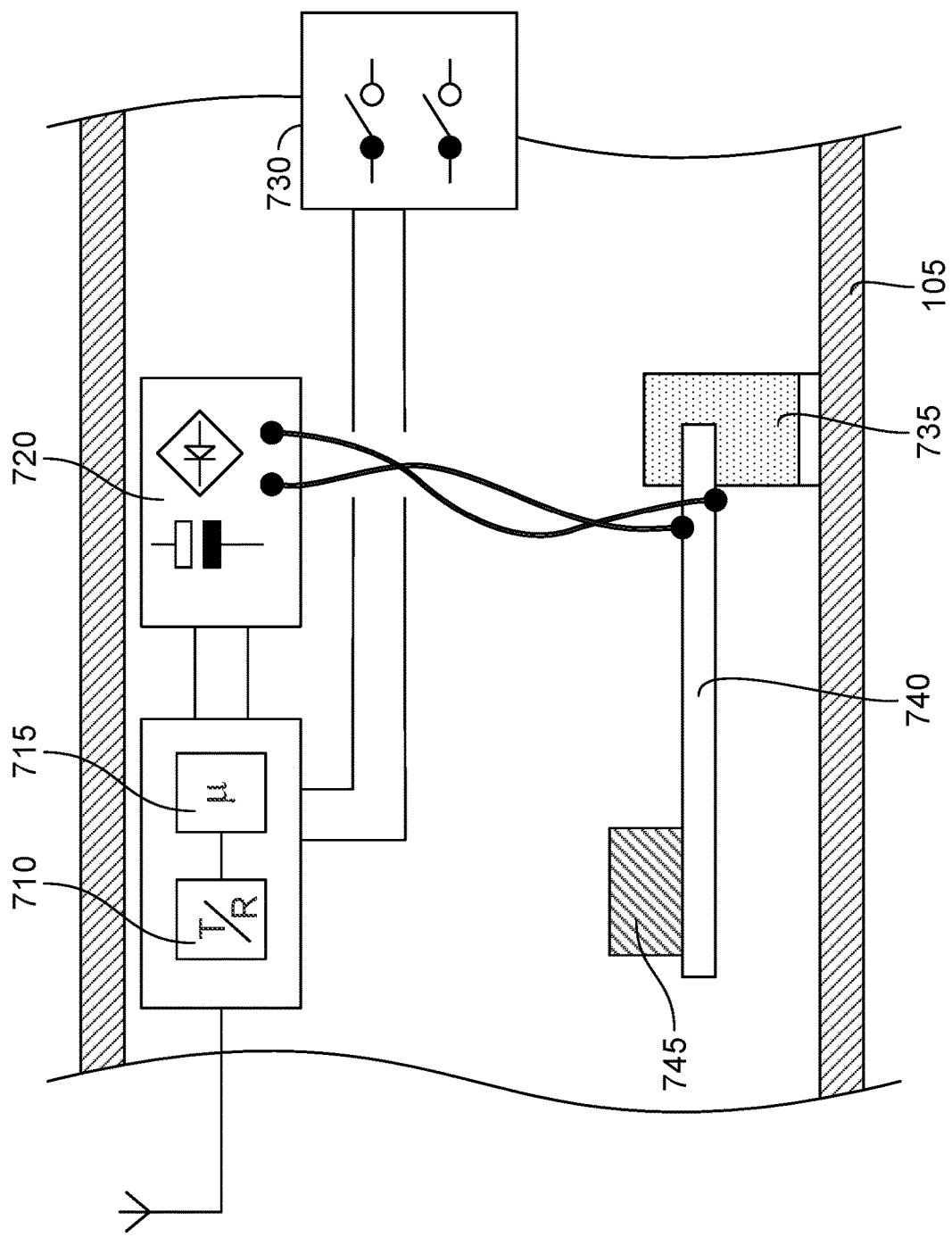
FIG. 7 illustrates an embodiment of an active RF system incorporated into a smart handle.

Turning now to the example of FIG. 7, in a system that incorporates an active RF system into the smart handle, a low power transceiver system 710 is embedded in the smart handle. In this example, a microcontroller 715 or other sequencing component, such as a state machine, controls the operation of the transceiver 710 and manages the power consumption as well as reading the state of any switch 730 inputs. Other types of input may also be incorporated, such as motion inputs provided from accelerometers or other sensing devices.

In some embodiments, a battery system is used to provide power to the system. In one embodiment, a power supply and energy storing system 720 recovers energy derived from a piezo transducer that converts user motion at the handle into an alternating voltage; the delivered energy is rectified and then stored in a capacitance or a rechargeable battery, or is used immediately without storage. In some embodiments, piezo transducer 740 is firmly mounted to the smart handle body 105 by a mounting block 735, and the free end has a mass 745 attached to it. When the user applies a force that displaces the smart handle, the acceleration causes a displacement of the mass 745 that physically bends or distorts the piezo element 740, which in turn develops a potential difference between electrodes that are attached to it. An example of a piezo material is Mylar.

In some embodiments, power supply 720 is connected to the transducer by a pair of conductors and converts this energy into a direct current that is then stored for use by the transceiver unit 710 under control of the controller 715. Although the output of these types of transducers may be small, any movement may harvest some energy and this accumulates. Even when the smart handles are being transported, uncoupled from the exercise appliance, the energy collection may continue. In one embodiment, two orthogonally mounted transducers are fitted so that almost any movement results in energy harvesting. The Bluetooth 5™ specification is one example of a communications system that contemplates a two-way low energy system that is intended for applications with lifetime battery operation. Because this is a low power solution, the need for battery maintenance is alleviated and, in some cases, removed entirely. In one embodiment, energy stored in the coupling component 205 of FIG. 2A is coupled to the smart handle power supply 720 which accumulates the transferred energy, and then uses this in turn to power the data transmission system. Here, a resonant antenna matches a radio transmitter at the coupling element 205 and although the efficiency of transmission of power may be low, accumulation over a lengthy period still results in sufficient power to render the smart handle operational.

In one embodiment, the coupling component has a communications system embedded within it, so the range requirement, and consequently the transmission power for data transfer from the smart handle, is undemanding and consistent with extreme low power consumption. The coupling component 205 in this example implementation receives the data from the smart handle 105 and retransmits this information to the exercise appliance. Because the coupling component is able to accumulate energy when it is in the resting position, such an intermediating link is robust and minimizes demands on the smart handle energy requirements for communication.

In some embodiments, feedback is provided to the user. Feedback to the user may be haptic, visual, and/or acoustic. In some embodiments, a vibrating device or haptic actuator is embedded within the user touch component. Further details regarding haptic feedback and embedding of a haptic actuator in a smart handle are described below.

Embedding a haptic actuator in the smart handle may require power at the smart handle; if the smart handle is intended to be a low power component, such a haptic actuator arrangement may be incompatible if lifetime battery operation is intended with minimal or zero charging.

In some embodiments, because the exercise appliance loading mechanism is coupled to the smart handles by a tensioned cable 105, the haptic interaction may be supplied by superimposing tension pulses onto the cable. These pulses may be shaped to achieve a pleasing vibration that cues the user that an interaction between the smart handle or handles and the exercise appliance has taken place. In one embodiment, cable vibratory cadence is alterable and incorporated into aspects of the exercise routine. A vibration cadence may be imposed that maximizes the energy harvesting performance of the smart handle. Examples of information that may be signaled to the user through any mode of vibration are counting down to the end of a movement set, notification that the user's form is incorrect, alert of low battery, or the alert of a new movement or personal record. In one embodiment, the vibration cadence is a vibration pattern with altered frequency, strength, and timing of the vibration. All may be combined to create a rich vibration pattern that allows the user to distinguish one cue/action from another.

In some embodiments, an exercise appliance includes a controller that provides the user with visual and acoustic cues similar to the interaction a user would experience from a personal trainer or coach, and is equipped with control interface components incorporated into the removable grips or handles that a user manipulates in order to exercise. An array of transducers and switches may be actuated by user movements that signal the desired interaction to the appliance controller. In some embodiments, haptic feedback is used to inform the user of interaction and a communications link couples the grips to the appliance. In some embodiments, a recharging system maintains the power supply to the grips when coupled to the appliance and a storage case incorporates a charging system to maintain charge when stored.

In one embodiment, a ring of buttons is provided, where the buttons are segmented into sections and a section is used with other sensors (e.g., IMU, cable length) to infer the orientation of the handle, which hand—left or right—is touching the handle, and so forth. Capacitive sensing may be used to determine when a hand is on the grip or goblet area or both or somewhere else. In one embodiment, this detects which hand—left or right—with multiple sensors. An inductive sensor may be used to sense deflection/force for a button push or other input. In one embodiment, a "dead man" switch, whether mechanical, capacitive, or otherwise, is used on the handle so weight cannot be turned on and/or functionality is limited if a hand is not on the handle. This may also be used to activate different segments of the button ring, for example, opposite of goblet contact area. Further details regarding determining the grip of a user and which hand is on which handle are described below.

In one embodiment, button travel is limited to be "radial" to avoid accidental presses from the side or when the handle is on the grip. In one embodiment, the hilt area of the handle (e.g., a ramp or slope) protects buttons from being pressed when the hand is on the grip. In one embodiment, the webbing/strap spins independently of the grip to allow electronics to move with the body/hand. For example, the webbing is attached to a ring, where the webbing ring is a load bearing portion that transfers the weight from the cable onto the shaft of the handle itself. Webbing length and hilt size may be chosen so it goes over fingers, instead of on them, during "axial" pulling moves like triceps kickback. Further details regarding handle design and ergonomics are described below.

In one embodiment, sensor fusion is used to push a button then rotate/tap/shake the handle to indicate the occurrence of an event. In one embodiment, a microphone is part of the handle to speak commands to the handle, where the audio is processed locally, on the trainer, and/or in the cloud. In one embodiment, algorithms are used to detect movement form. In one embodiment, algorithms are used to detect which movement is being performed, number of repetitions, position, speed, acceleration, path of movement, and/or force.

In one embodiment, tracking of the position of the trainer from the handle or the position of the handle from the trainer is used to detect form or gestures for user input. One example is for a user to draw a star in the air to pair a user's handles with the closest trainer. In one embodiment, this uses the BLE v5 feature of Angle of Arrival (AOA) and Angle of Departure (AOD) to locate an object in 3D space. This feature allows for accurate (e.g., 1 cm resolution) three-dimensional spatial locating. This feature may be used to auto pair or auto connect to a trainer when it is within a certain distance of the trainer. In one embodiment, an IMU is used to generate this pattern recognition with accelerometer/gyroscope data.

In one embodiment, the position of any nearby trainer is tracked to automatically connect to the closest one, as in a gym scenario. In one embodiment, a force sensor in the grip is used with force patterns to turn weight on/off, so a user does not have to move their hand when under exercise load. In one embodiment, the handle, when angled past a certain threshold, turns digital weight on/off, a handle equivalent to a bar bail. In one embodiment, weight adjustments or other functions such as media control from the handle use a combination of an input such as a button hold or double click and a cable pull or release to adjust the weight, using a button hold or double click and a handle rotation to adjust the weight for example. A double click or triple click may be used to adjust the weight upward or downward.

In one embodiment, a handle design that is also functional for goblet squats is used. In one embodiment, a comfortable shape to be able to take a high load for goblet squats is used. In one embodiment, a webbing attachment is used that rotates separately from the grip area, including features such as an easy reach to the buttons for functionality such as weight On/Off or weight increase/decrease, depending on webbing length. This avoids webbing twist by not allowing the webbing to pass over the ends. Larger diameter ends protect buttons from being pressed when ground is contacted. Further details regarding such a handle design are described below.

In one embodiment, a handle is designed that, when used with a single hand, has buttons or actuators that are easily pressable when there is high load present, is reversible so it may quickly be picked up without worry about orientation, and/or has buttons around 360 degrees of the handle so that regardless of rotation position of the hand on the handle it is equally easy to press the buttons. In one embodiment, flexible circuits or MID technology such as LDS or printed circuits may enable this 'ring' of buttons without needing individual switches. An example of a ring actuator is described in further detail below.

In one embodiment, in order to have an IMU (3, 6, or 9 axis) and obtain unconstrained data from the IMU in the handle, a design is implemented where the IMU has freedom of rotation from the cables. In one embodiment, the IMU is centered to reduce eccentricity issues. In one embodiment, a bar control module is a clip-on to ropes or via magnetic attachment to metal bars, which performs similar interactions as smart handles—such as adjusting weights, measuring path of motion, or gesture recognition through inputs such as the buttons and IMU. In one embodiment, straps such as ankle straps, leg straps, and wrist straps are also implemented as smart accessories with similar IMU, haptic, LED, and button, pressure, or tension sensor features.

The following are further embodiments and details regarding smart handles and smart exercise accessories. While embodiments involving smart handles are described herein for illustrative purposes, the techniques described herein may be variously adapted to accommodate other types of exercise accessories.

Figure 8A:
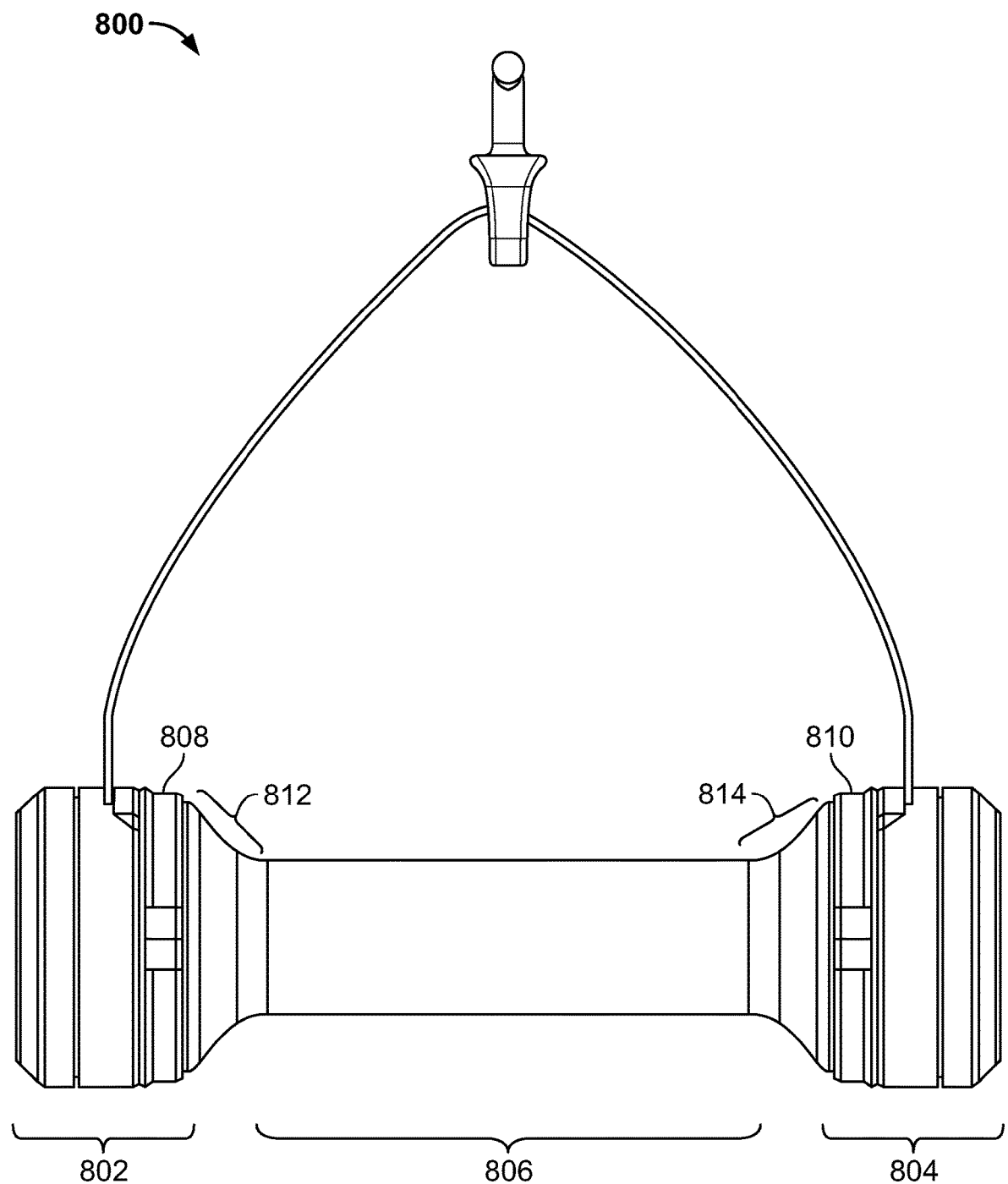
FIG. 8A illustrates an embodiment of a front view of a smart handle.
Figure 8B:
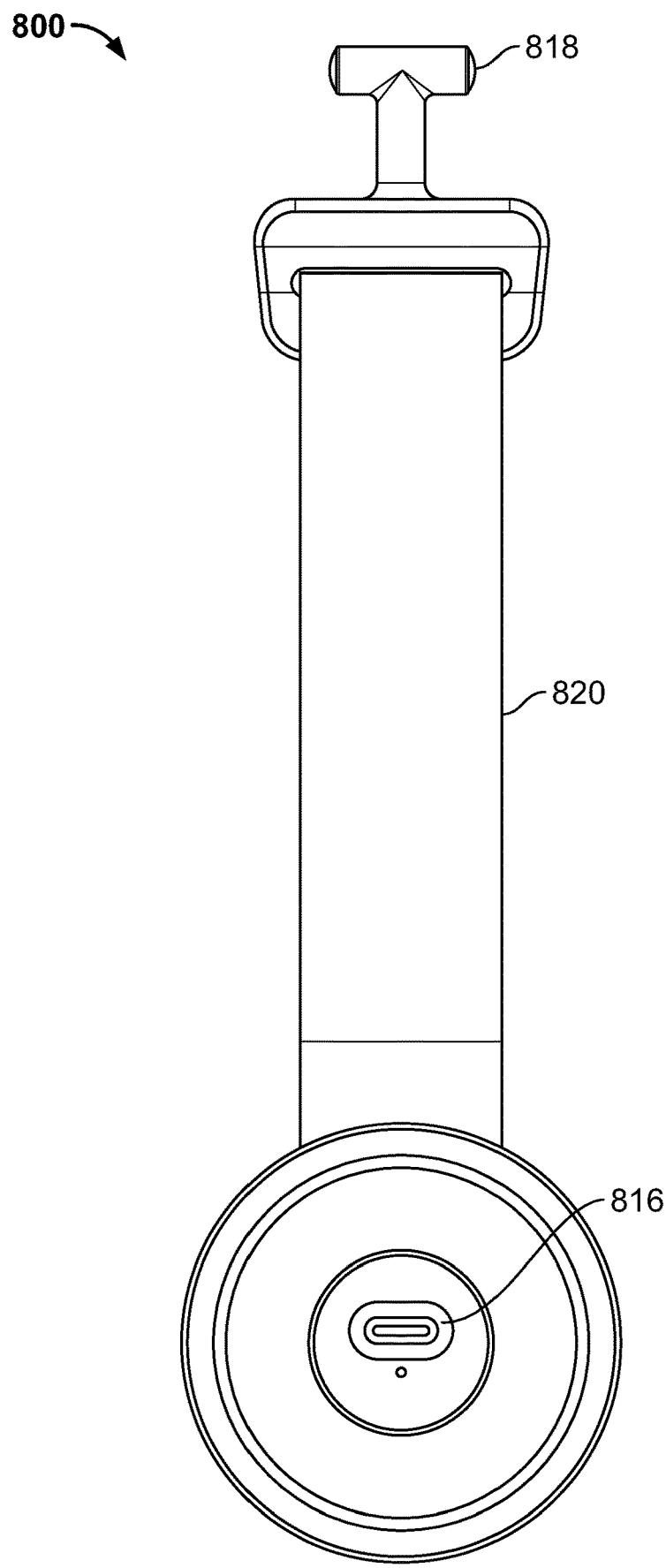
FIG. 8B illustrates an embodiment of a side view of a smart handle.
Figure 8C:
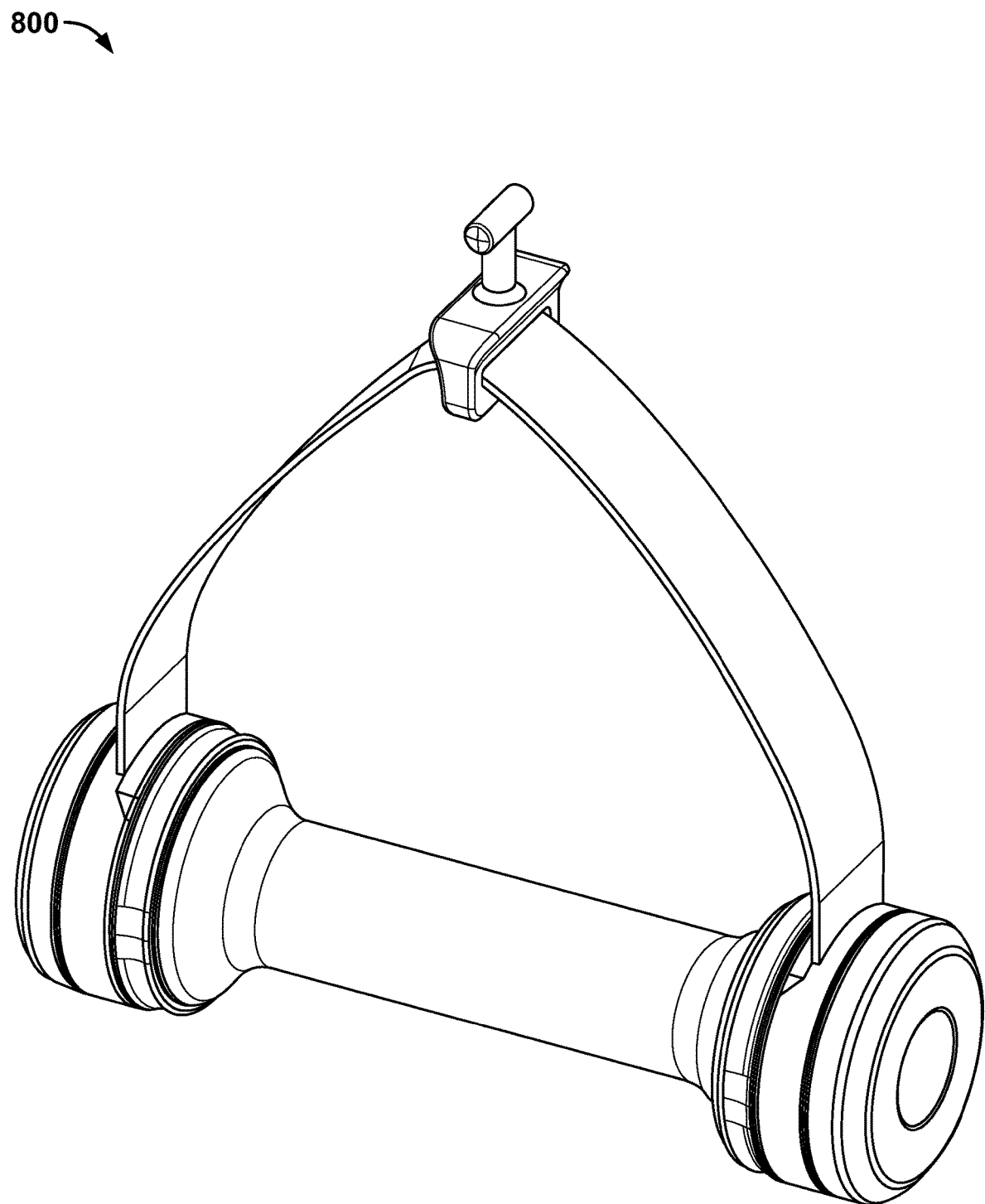
FIG. 8C illustrates an embodiment of a three-quarters view of a smart handle.

FIGS. 8A-8C illustrate an embodiment of a handle. In some embodiments, the design of the handle 800 illustrated in FIGS. 8A-8C is an embodiment of a handle design that is also functional for goblet squats, as described above.

Handle Layout and Ergonomics

FIG. 8A illustrates an embodiment of a handle. As shown in this example handle, the outer portions 802 and 804 of handle 800 at its ends are larger than the middle grip area/shaft 806. Here, the handle has the shape of a barbell. With this handle shape, various types of grips are accommodated, allowing different ranges of motion. As one example, with this handle shape, the outer portions 802 and 804 of the handle may be used as grips for two-handed movements (e.g., movements where the user uses both hands to hold a single handle). As shown in this example, the handle is symmetrical.

As described above, the ergonomic handle design shown in the example of FIG. 8A is conducive for exercises such as goblet squats. For example, using the ergonomic handle design of handle 800, the enlarged outer portions 802 and 804 provide purchase for a user's hands to hold onto, from the heel of their hand, onto the side of the handle for load bearing.

The ergonomic design of handle 800 provides a more uniform and safer way for users to hold the handle for various types of movements, where users may be more easily instructed on how to hold the handle for proper form when exercising.

As shown in the example of FIG. 8A, handle 800 includes ring actuators 808 and 810. As will be described in further detail below, the ring actuators are examples of buttons that a user may activate or actuate to provide commands or instructions to the exercise machine. In this example, the ring actuator is 360 degrees accessible. Further details regarding assembly of ring actuators will be described below.

As shown in this example, there are ramps 812 and 814 between the bulbous end 802 and 804 of the handle (that includes the ring actuators 808 and 810, respectively) and the shaft 806 of the handle. The ramps between the ring actuators and the middle grip portion of the handle form hilts that prevent the actuators from accidentally being triggered by a user, while still being accessible. Having a ring actuator as described herein that is large and 360 degrees accessible (where a user interacts with the outer surface of the cylindrical ring), as well as having a hilt (formed by the ramp) that puts the actuator away from where the user's hand would deform under load, allows the actuator to be accessible and pressable, while avoiding or minimizing accidental presses.

Continuing with the example of FIG. 8A, FIG. 8B illustrates an embodiment of a side view of smart handle 800. FIG. 8C illustrates an embodiment of a three-quarters perspective view of the handle. In some embodiments, electronics for the smart handle are embedded in the shaft 806 of handle 800. As will be described above, in some embodiments, the electronics are included in a shuttle that is inserted into the shaft of the handle. An example of a shuttle is described in conjunction with FIG. 9D.

In some embodiments, the shuttle includes a holder for an integrated, rechargeable battery. The battery may be charged via a port such as a Universal Serial Bus (USB) port. An example of such a port is port 816, as shown in the example of FIG. 8B.

As described above, inductive charging may also be used. In other embodiments, the handles include energy harvesters. For example, energy may be harvested from button presses. As another example, solar chargers may be used. In some embodiments, radio frequency (RF) energy (e.g., from WiFi) is used to charge up a battery or capacitors. For example, a 2.4 GHz wave from the exercise machine may be sufficient to charge up a capacitor in the handle to transmit a button press to the exercise machine.

As described above, in some embodiments, the handle includes a radio such as a Bluetooth radio. In some embodiments, Bluetooth BLE 5.1 is included, which allows for detection of the handle in 3D space. In this way, absolute position of the accessory may be determined (which is in contrast to an IMU, which provides relative positioning). In some embodiments, to accommodate the radio and allow transparency, the handle is made from plastic. This allows the radio to be placed anywhere within the device. A hard plastic may be used for durability and rigidity.

Ring Actuator

In the example shown in FIG. 8A, handle 800 includes two ring-shaped actuators 808 and 810 that are circular in shape (e.g., a hollow circular shape). In some embodiments, the ring actuators are buttons or controls for controlling an exercise machine such as the digital strength trainer described above. As shown in this example, the ring actuator is 360 degrees accessible. The following are examples and embodiments regarding the ring actuator.

As shown in the example of FIG. 8A, the ring actuators 808 and 810 are placed toward the outer ends of the handle. The ring actuators are oriented in the same manner as the shaft of the handle, where the circumferences of the ring actuators are oriented in the same direction as the circumference of the handle shaft, and where the centers of the ring actuators and the shaft are aligned along the same axis (that is the center axis of the ring actuators and the center axis of the shaft cylinder are along the same or parallel lines). The ring actuators are in line with the handle shaft. For example, the ring-shaped actuator is oriented substantially concentrically to the shaft. The ring shape, in addition to the placement of the ring actuators, facilitates improved accessibility to the buttons, regardless of the different ways that a user may be holding the handle. For example, even if the user is using both their hands to grip the handle by holding the enlarged outer end portions 802 and 804 of the handle 800 (e.g., when performing a goblet squat movement), they are still able to activate the ring actuators with their thumbs. The ring actuators are accessible from all sides, with various fingers being able to access the actuator regardless of the type of handhold being used to grip the handle.

In some embodiments, the ring-shaped actuator is responsive to radial pressure. This includes a user pressing on the ring, where the force is exerted towards the ring's center or central axis. Pressing on the ring causes a control signal to be transmitted from the handle. In other embodiments, the ring is rotatable, where rotation of the ring causes control signals or commands to be transmitted. For example, the rotation of the ring may be used as a scroll wheel.

Having a more accessible button provides various ergonomic benefits due to the flexibility in the ways the ring actuators may be reached. As one example, users can be more centered when performing an exercise, rather than having to, for example, stretch their hand or maneuver the handle in such a way that they can reach the button, which may lead to form issues.

In some embodiments, the ring actuators 808 and 810 are recessed. In this way, the handle may be left on a flat surface, without the ring actuators accidentally being pressed. In some embodiments, the ring actuators may be used to turn the digital weight on/off (e.g., by issuing commands controlling whether the motor provides resistance or not). Recessing the ring actuators prevents the weight from being turned on accidentally or unexpectedly when, for example, a user is switching from a two-handed movement to a one-handed movement, and a handle is dropped. By recessing the ring actuators, even if the handle is dropped, there is a high degree of certainty that the weight will not be accidentally engaged.

Ring Actuator Assembly

Figure 9A:
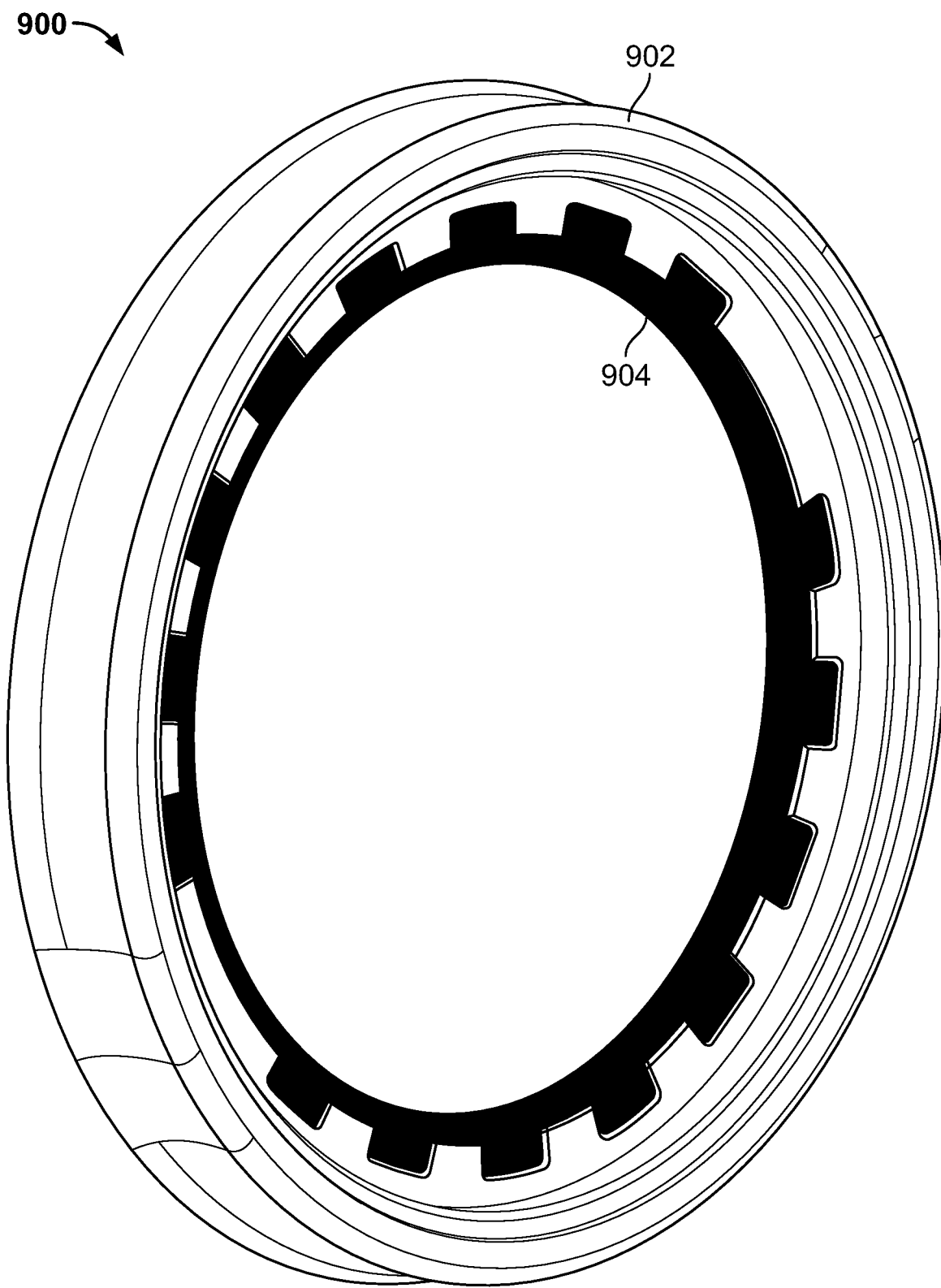
FIG. 9A illustrates an embodiment of an outer ring component of a ring actuator assembly.
Figure 9B:
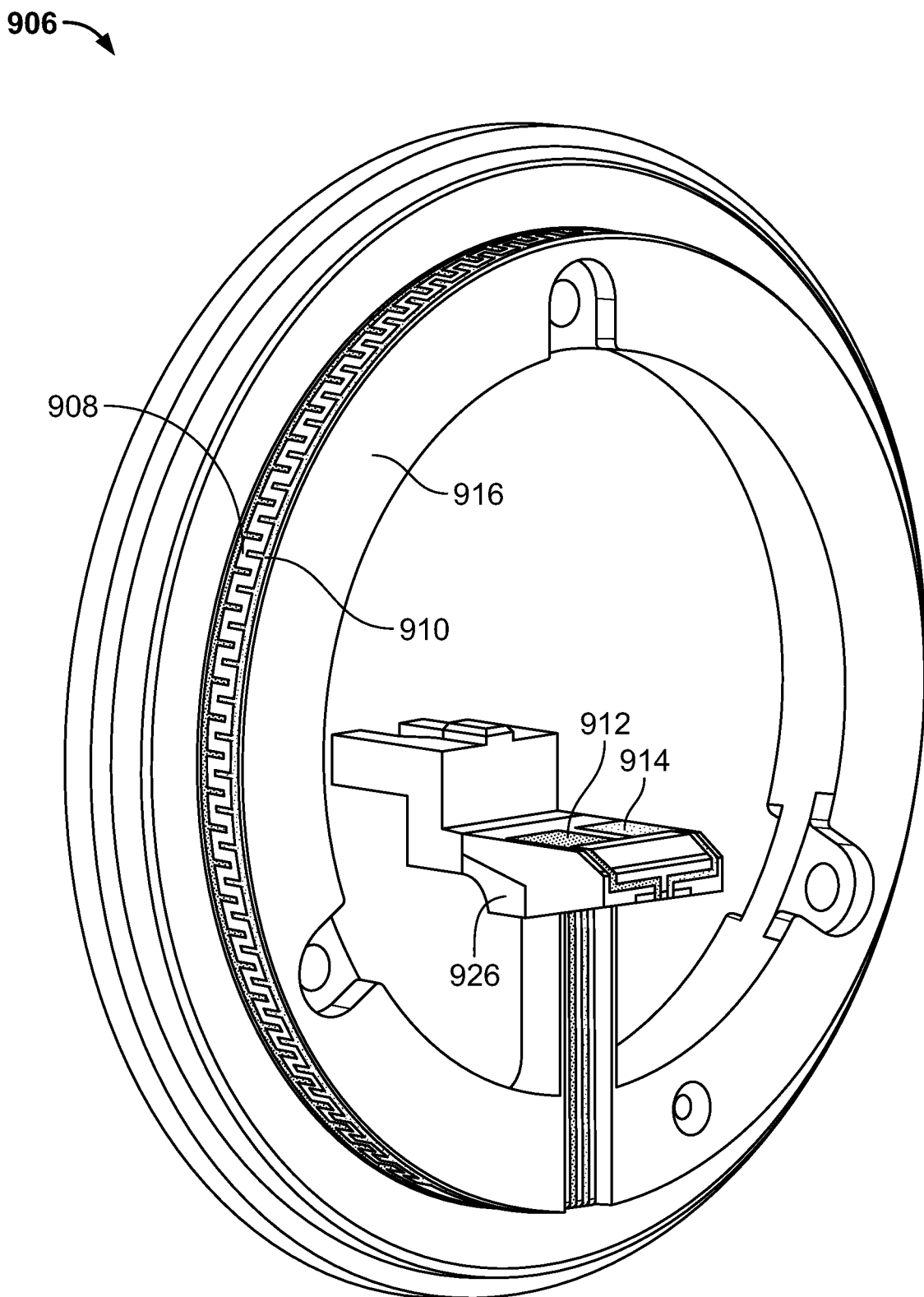
FIG. 9B illustrates an embodiment of an inner ring component of a ring actuator assembly.

The following are details regarding the assembly of a ring actuator that is circular in shape. In some embodiments, the ring actuator includes two portions, an outer ring component and an inner ring component. FIG. 9A illustrates an embodiment of an outer ring component of a ring actuator assembly. FIG. 9B illustrates an embodiment of an inner ring component of a ring actuator assembly.

As shown in the example of FIG. 9A, the outer ring component 900 includes two layers. The first is an outer layer 902, which, for example, is a surface that is exposed to the user and that the user interacts with. The second layer of outer ring component 900 is a conductive rubber 904 (other conductive materials may be used as well in other embodiments). As will be described in further detail below, when the outer ring component is pressed upon by a user with sufficient force, the conductive rubber 904 will come in contact with electrical traces on an inner ring component.

As shown in the example of FIG. 9B, the inner ring component 906 includes two traces 908 and 910. The two traces run around the circumference of portion 916 of the inner ring component, and terminate at terminals 912 and 914, respectively. As shown in this example, the terminals are on an end of key structure 926 of the inner ring component. As will be described in further detail below, when the handle is assembled, the terminals 912 and 914 will be in contact with leads on a PCB included in the shaft of a handle such as handle 800.

In one embodiment, the ring actuator is implemented using an MIDs (Molded Interconnect Devices)/LDS (Laser Direct Structuring) process. For example, the ring actuator is plastic that is laser etched and dipped in a material such as gold.

Figure 9C:
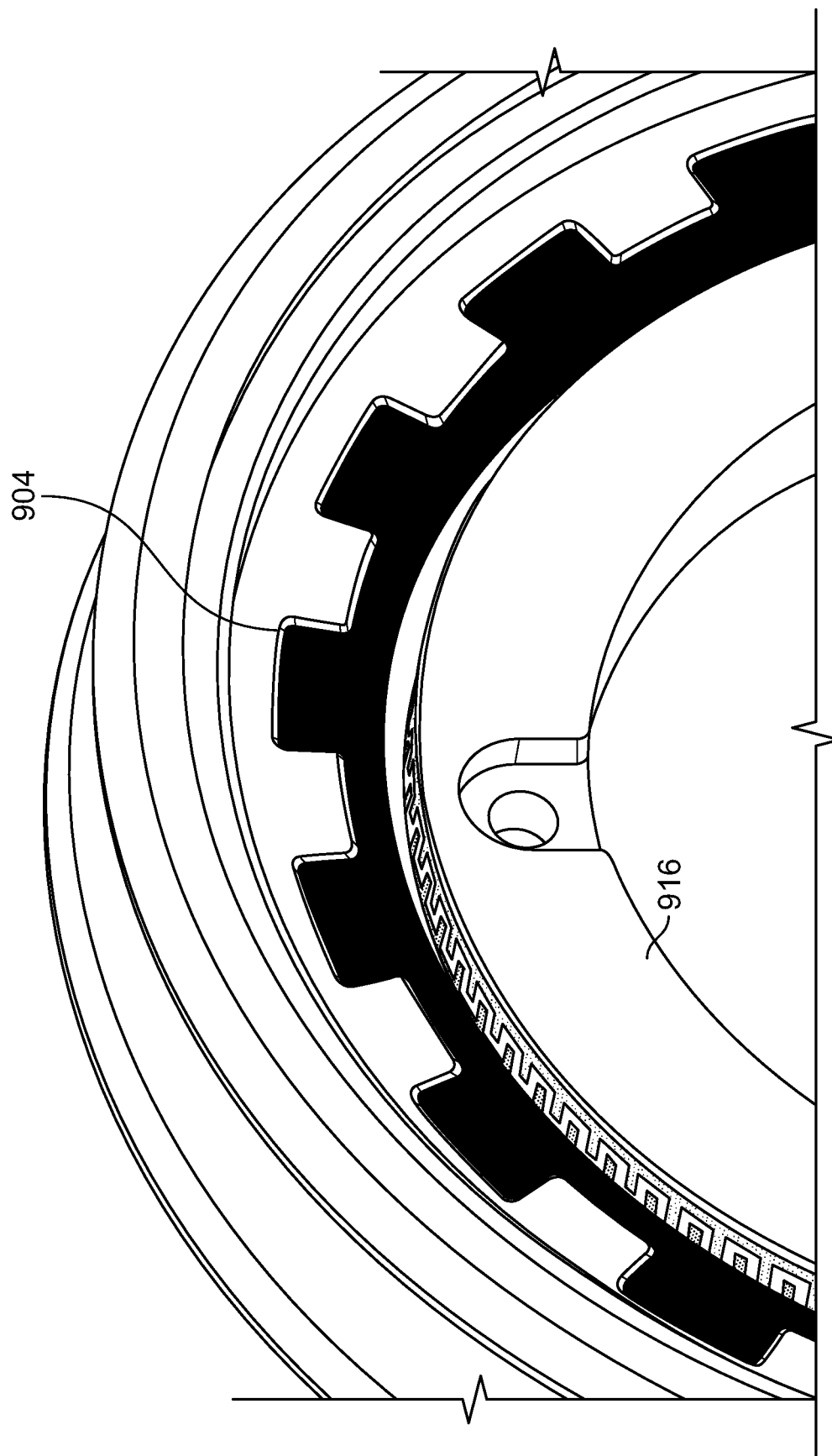
FIG. 9C illustrates an embodiment of a ring actuator assembly.

In some embodiments, when assembled, the outer ring component 900 fits over the inner ring component 906. FIG. 9C illustrates an embodiment of a portion of a ring actuator assembly. In the example of FIG. 9C, the outer ring component of FIG. 9A has been fitted over the inner ring component of FIG. 9B.

As shown in this example, when not depressed, the conductive rubber ring 904 and portion 916 of the inner ring component that is circumscribed by traces 908 and 910 form concentric circles that do not touch. In this way, the circuit formed by the traces (which are in connection with the PCB, as will be described in further detail below) is open when the user is not pressing down on the outer ring component.

In some embodiments, the traces in the ring actuator are used to carry various signals, such as ground, a 3.3V signal, etc. When the user pushes on the ring actuator, this causes the conductive rubber 904 to bridge the traces 908 and 910, closing a circuit. As shown in this example, the traces wrap around the inner ring. The conductive rubber also wraps around in a circle. In this way, the button can be actuated anywhere along the ring. Thus, when the ring actuator is pressed by the user, this user action causes the conductive rubber to bridge the two traces, thereby closing a circuit, and triggering a button press. As will be described in further detail below, the closing of the circuit is sensed by electronics in the smart handle, which detects that it has been pushed.

In some embodiments, a foam ring is included that maintains a gap between the conductive rubber of the outer ring component and the traces of the inner ring component until a user presses down on the surface of the button. The density of the foam determines the amount of force required for a press to cause the conductive rubber to contact the traces on the inner portion of the ring.

Figure 9D:
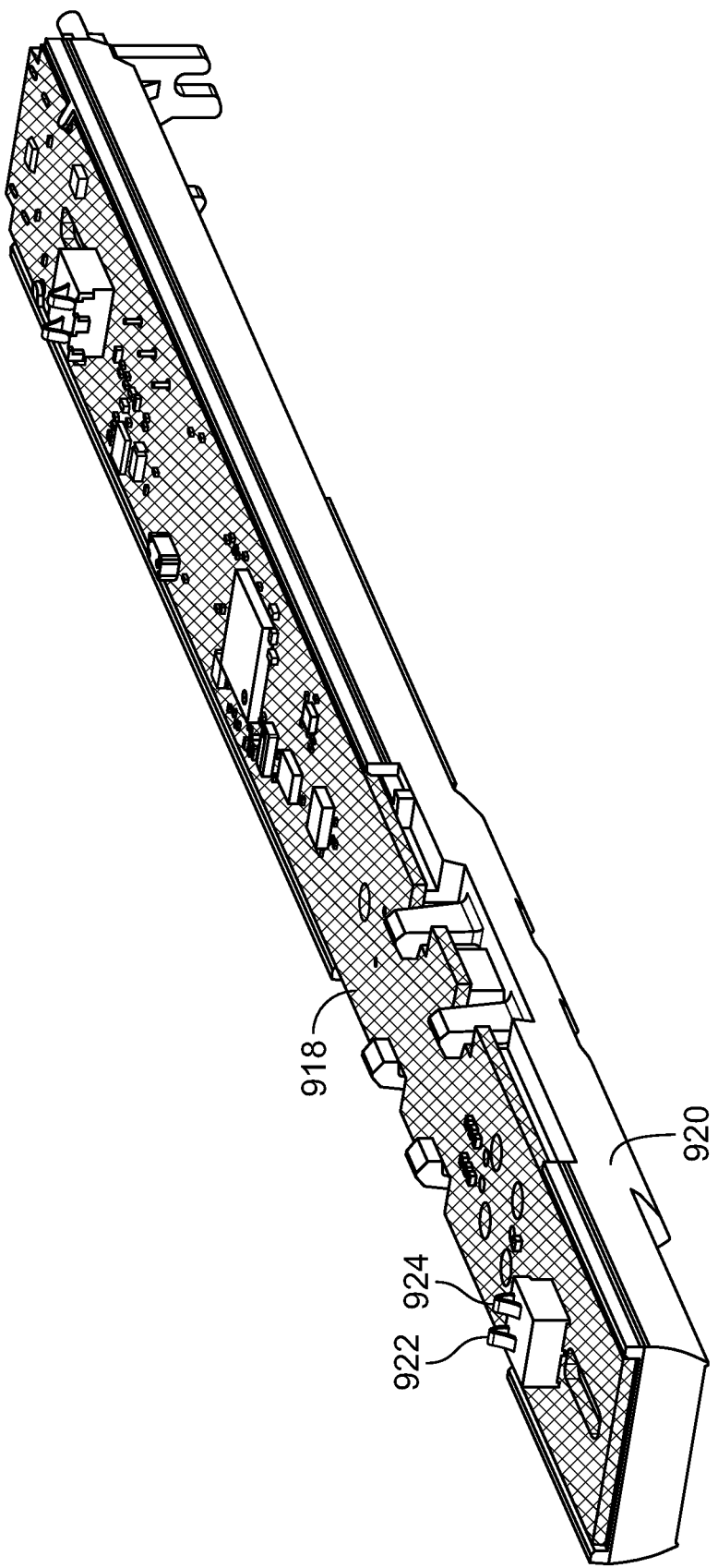
FIG. 9D illustrates an embodiment of a smart handle PCB.

FIG. 9D illustrates an embodiment of a PCB (printed circuit board) for a smart handle. In this example, PCB 918 is included in a shuttle structure 920 that is included in the shaft of a handle such as handle 800.

In the example of FIG. 9B, the traces 908 and 910 terminate at terminals 912 and 914. When assembled (e.g., when the ring actuator assembly is combined with the handle when the handle is put together), terminals 912 and 914 touch contacts 922 and 924 that are on PCB 918. As one example, the leads/contacts 922 and 924 are implemented using leaf spring contacts on the PCB. Pogo pins may also be used. Here, the two traces on the inner trace ring touch respective leaf springs on the PCB, where one is for ground, and the other is for (e.g., 3.3V) signal. In some embodiments, a handle includes two ring actuators, and the PCB includes, on the opposite end, a second set of leaf springs for contacting a second ring actuator assembly at the other end of the handle.

Figure 9E:
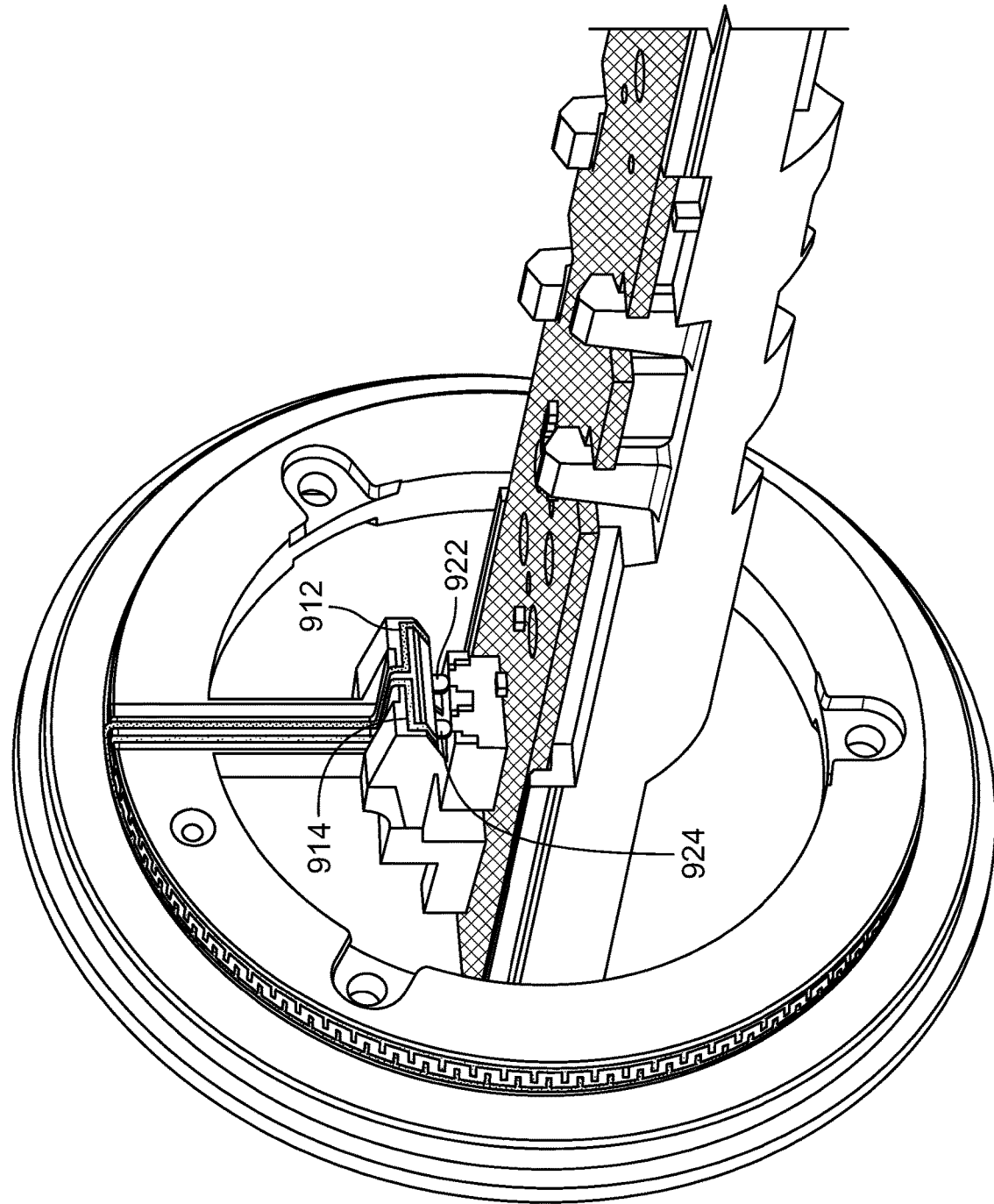
FIG. 9E illustrates an embodiment of a ring actuator in contact with a PCB.

FIG. 9E illustrates an embodiment of a ring actuator assembly in contact with a PCB. As shown in this example, terminals 912 and 914 are in contact with leaf springs 922 and 924, respectively. As described above, when the actuator is not pressed, there is a gap between the inner ring and the outer ring. When a user presses on the outer ring, it causes a foam ring to deform, allowing the conductive rubber to touch the traces on the outer edge of the inner ring. This causes contact between the conductive rubber and the traces of the inner ring, closing the circuit by bridging the traces on the outer circumference of the inner ring. A microcontroller on the PCB detects the closing of the circuit (where the leaf springs connected to the terminals of the inner ring are the conduit to the PCB). In this way, the circuit is completed when the user presses anywhere on the ring actuator, and the button press is detected.

As shown in this example, the mechanical assembly of outer ring component 900 translates a user's press into closing of an electrical circuit by coming into contact with the electrical assembly of inner ring component 906. The use of PCB with a leaf spring as described above, in combination with a ring with traces on it, provides ease of manufacturing, as the leaf spring allows tolerance in assembly gaps in the manufacturing of the inner ring, but still allows a connection to be formed.

While two traces were shown in the example above, more traces may be implemented. For example, the ring actuator may be implemented to have various signals corresponding to various zones. As one example, the ring actuator may have five signals running through it—one ground, and four other zones—allowing for the 360 degree surface of the ring actuator to be divided into quadrants. Different numbers of zones or sections may be implemented and used for different purposes. The different zones may be implemented by printing different trace patterns on the inner ring. For example, one zone may be used for adjusting weight. Another zone may be for controlling media controls (e.g., for playing audio tracks, changing audio volume up or down, etc.). In some embodiments, the different zones may be color coded on the ring actuator.

By using a ring structure, the user is provided a uniform feel when pressing on the ring button, regardless of where they press. That is, there is an isotropic button feel.

In some embodiments, the handle is sealed for dust and water on either side of a ring actuator, as there may be gaps between the ring actuator on each side. For example, lips and channels are included that deflect water and dust away from the electronics inside the handle. This prevents, for example, shorting of the traces on the handle and inadvertent button presses.

In other embodiments, rather than using the LDS/MID-process ring as described above, the ring actuator may be implemented by including a PCB that is then wired to the PCB in the shuttle. However, this may have issues for both assembly (e.g., because of tighter tolerances being needed) as well as field use (where the cable may become loose when the handle is dropped). In an alternative embodiment, the ring actuator is implemented using a circular PCB (printed circuit board) with edge mounted buttons. The ring actuator is slid over the shaft of the handle. Flexures in the plastic ring surrounding the PCB flex downwards and press the edge mounted buttons.

Haptic Feedback

As described above, haptic feedback may be provided. Further example details and embodiments regarding providing haptic feedback are described below.

In some embodiments, the smart handle described herein includes haptic actuators such as ERM (eccentric rotating mass) motors and LRAs (linear resonant actuators). The haptic actuators are used to provide various feedback during workouts. For example, different haptic patterns may be used to convey different types of information pertaining to a workout.

As one example, one haptic vibration pattern may correspond to, or represent, counting down the number of reps in a set. Another haptic pattern may be used to indicate when a user is halfway through a set or a time period. Another haptic pattern may be used to indicate that a user's form is incorrect. As another example, the handle may vibrate with different levels of intensity that correlate to how much weight is currently being loaded by the exercise machine. Various other types of cues or information may be communicated via haptic feedback. The haptic feedback may be used instead of, or in addition to, audio cues. For example, the use of haptic feedback is beneficial in environments or situations where audio cues may be a disturbance. In this way, cues may be provided in a manner that the user is able to feel, but is silent and not readily audible to others.

In some embodiments, as described above, the exercise machine includes a computing device (e.g., an Android device) that provides various exercise processing logic. In some embodiments, the exercise machine sends haptic patterns to be played by the accessory (where the accessory includes a memory to store the patterns and a mapping of events to patterns), where the patterns are played in real time. This provides a rich contextual language that can be provided to users that can be updated at any time (e.g., as an OTA (over the air) update). The patterns may also be provided to the electronics in the handle through a wired connection (e.g., through a port such as a Universal Serial Bus (USB) port 816 in the handle).

As one example, the PCB in the shaft of the handle (e.g., PCB 918 of FIG. 9D) includes a microcontroller that is connected to the haptic actuator. The microcontroller loads a haptic pattern to play, and controls the haptic actuator accordingly.

In some embodiments, the haptic actuator vibrates the entire handle. In other embodiments, the handle may include multiple haptic zones, where different portions or regions of the handle may be vibrated independently.

Haptic Language Syntax

Haptic patterns may be defined by adjusting or varying parameters such as vibration intensity and duration. This provides an expressive language by which various types of patterns for different types of indicators may be developed.

As one example, the haptic actuator vibrates according to a command provided, for example, by a microcontroller. In some embodiments, the structure of the command is defined by an intensity of the vibration, and a set of pairs indicating a duration for which the vibration is off and a duration for which the vibration is on, where there may be multiple vibration off/on pairs with different off/on durations in a pattern to be played. In some embodiments, there is a mapping that specifies a correspondence between events and the corresponding patterns that are triggered in response to occurrences of the respective events.

FIG. 10 illustrates an embodiment of a haptic vibration command structure. A triggering event is shown at 1002. In response to event 1002 occurring, vibration pattern command 1004 is issued. In this example, as shown at 1006, the vibration intensity is set at 100% (e.g., maximum intensity). The first pair of vibration off/on with durations is shown at 1008, and shows (0 50). This indicates that the vibration is off for zero milliseconds, and then on for 50 milliseconds at 100% intensity (that is, the vibration starts immediately, with no delay). The next vibration duration pair is (40 100), as shown at 1010. This means that after vibrating for 50 milliseconds, there is no vibration for 40 milliseconds. Then, the actuator vibrates for 100 milliseconds.

As described above, various haptic patterns may be played in response to different types of events, such as countdowns, expiration of timers, indicating spotting or burnout when the user is struggling, vibrations to convey to a user that the weight is being adjusted downwards or upwards, etc.

Ring Actuator with Haptic Feedback

As described above, in some embodiments, the smart handle includes a ring actuator that is usable to take user inputs. In some embodiments, with an MIDs process, there is not the tactile feel of rubber touching plastic that might be felt using, for example, a mechanical push. In some embodiments, haptic feedback is provided when a user activates the actuator to provide a physical sensation of pressing the ring actuator.

Figure 11:
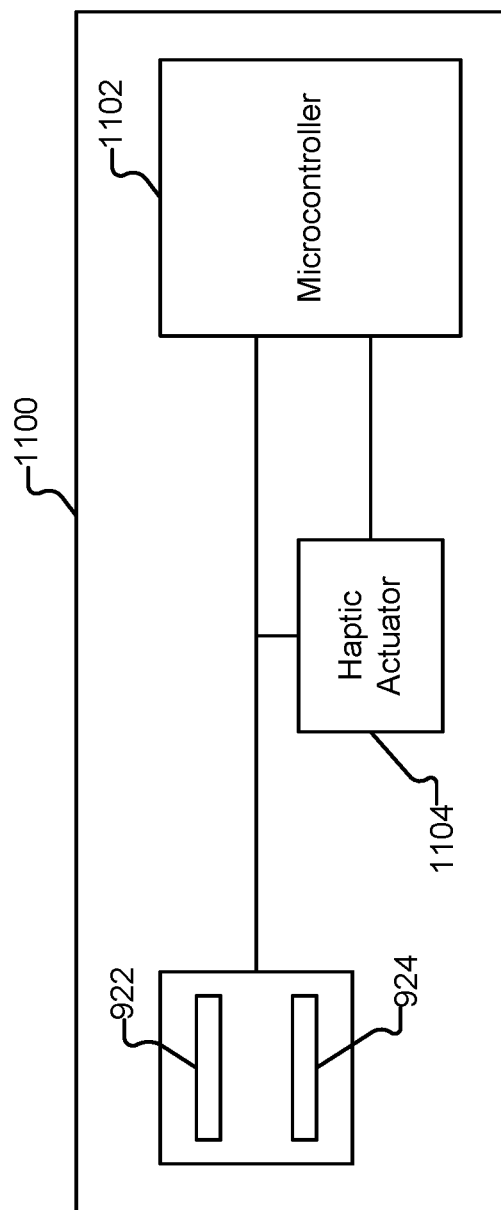
FIG. 11 illustrates an embodiment of a haptic feedback architecture.

In some embodiments, latency optimization is provided to minimize the latency between the pressing of the button and the vibration by the haptic actuator in response. FIG. 11 illustrates an embodiment of a haptic feedback architecture. In this example, haptic feedback architecture is a portion of PCB 918 of FIG. 9D. Haptic feedback architecture 1100 includes a component usable to detect a button press. For example, the architecture includes leaf springs 922 and 924, as described in conjunction with FIG. 9D, where the leaf springs are in connection with the terminals of an actuator such as the ring actuator described above.

In some embodiments, a signal is generated when the ring actuator is pressed. In this example, the signal on the leaf springs is routed directly to the haptic actuator 1104. When a button press is sensed, the haptic actuator immediately responds with a pattern that is preprogrammed into the haptic actuator (e.g., by microcontroller 1102). As this button-vibration control is implemented in hardware, there is minimal communication latency. This provides immediate feedback to a button press. If such latency optimization were not performed, a user may subliminally hold a button longer until the delayed haptic feedback arrives, which may tire their hand as they press the button multiple times over the course of a workout.

Haptic Motor Integration

Haptic actuators may be integrated into the smart handle in a variety of ways. As one example, the haptic actuator is fit inside the diameter of the cylindrical handle, with a flexible cable to connect to circuitry on the PCB embedded within the handle. As another example, an actuator such as an LRA is mounted directly to the PCB. This provides improved manufacturing ease and reliability. For example, the shuttle 920 of FIG. 9D also holds the LRA. In some embodiments, the shuttle includes clips and/or springs that provide force to keep the LRA firmly pressed against the shuttle, where the haptic actuator vibrates against the shuttle.

Figure 12:
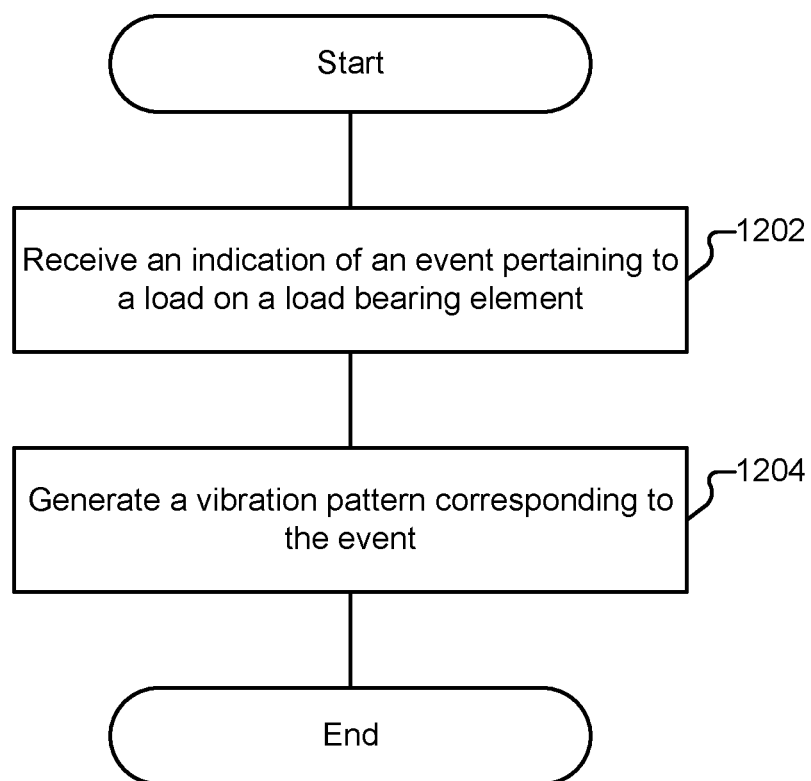
FIG. 12 illustrates an embodiment of providing haptic feedback for exercise.

FIG. 12 illustrates an embodiment of providing haptic feedback for exercise. In some embodiments, process 1200 is executed by an exercise accessory such as handle 800 of FIGS. 8A-8C. The process begins at 1202 when an indication of an event pertaining to a load on a load bearing element is received. For example, a request to turn on or off a digital weight is received when a user presses on a button on the exercise handle (e.g., load bearing element). At 1204, a haptic vibration pattern is provided as feedback based on the event pertaining to the load of the load bearing element.

Pairing on Physical Connection

Described above are embodiments of an exercise machine with adjustable load arms. The smart handles described herein may be attached to the arms (e.g., by connecting the handles to a ball stop or another coupling component on the arm). Described herein are techniques for determining what particular handle is connected to which particular arm or side of the exercise machine. For example, using the techniques described herein, which handle is connected to which ball stop may be determined. As the ball stop is connected to a particular trainer, which specific trainer a specific handle is connected to may also be determined.

Such trainer-handle (or trainer arm-to-handle) correspondence identification and determination provides various benefits. Consider, as one example, a gym or hospitality program (e.g., hotel gym) context. Suppose that in a gym there are multiple exercise machines. Users may swap out various accessories such as handles, bars, etc. between exercise machines. Using the trainer-handle identification techniques described herein allows for there to be a repository of smart handles (e.g., a box of handles), where a user can pick up an arbitrary smart handle, and upon connection to a specific trainer, have the smart handle linked to that specific trainer (so that the smart handle may be used to control the trainer, for example).

As one example, a pair-on-physical connection protocol is used. In some embodiments, before pairing a smart handle to a specific trainer, an intent to connect is first determined. This includes a physical linking of the smart handle to the trainer, such as by connecting the smart handle to a ball stop at the end of the arm of the trainer.

As described above, in some embodiments, a single wire interface or protocol is used to transfer data and power between the smart handle and the trainer. In some embodiments, the handles include a strap or mesh (e.g., webbing 820 of handle 800 as shown in the example of FIG. 8B) that is conductive that forms a conductive path from the grip of the smart handle, through the locking mechanism (e.g., T-shape lock 818 of handle 800 of FIG. 8B), and to the ball stop or other coupler/coupling component of the exercise machine to which the smart handle is mated/coupled.

As described above, in some embodiments, each ball stop has a unique identifier (e.g., a 128 bit address such as a universally unique identifier (UUID)). The ball stop includes a wire that connects to the handle (via the mating mechanism and the conductive strap or other conductive channel, such as a rigid conductive structure, to the electronics in the smart handle). When the smart handle is mated to the ball stop, the smart handle senses the connection and provides the ball stop with power (e.g., powers a chip in the ball stop). The ball stop then provides its identifier to the handle in response. The ball stop is attached to a specific trainer, which knows which ball stops are attached to it (e.g., the trainer may be configured, at production time, to be associated with ball stops with specific identifiers). In some embodiments, the handle then broadcasts a message, for example, requesting to connect to the trainer that has the ball stop with the ball stop identifier received by the handle. The smart handle may then be paired with only that trainer with that particular ball stop.

In the above example, the physical connection of the smart handle to a particular ball stop provides an indication or intent to establish a link between the smart handle and the trainer to which the ball stop is attached. Once a handle is connected to a specific ball stop, the exchange of information is made (i.e., the ball stop identifier is passed to the smart handle), and the smart handle becomes aware of the specific ball stop that it is connected to. The smart handle then advertises a request to connect to the exercise machine that has the ball stop with the unique identifier that the smart handle received from the ball stop to which it is mated. For example, the smart handle accessory advertises an advertisement packet that includes the ball stop identifier. The exercise machine scans for requests and determines that the particular smart handle is advertising a request to connect to it, because the exercise machine has the ball stop with the identifier included in the packet advertised by the smart handle. The pairing or linking request may be sent out from the smart handle via various wireless links or protocols such as Bluetooth, another RF protocol, etc.

The trainer then connects to the smart handle. Further, in some embodiments, because the ball stop is attached to a particular arm of the exercise machine, the exercise machine also determines which particular arm the smart handle is attached to (e.g., that the smart handle is connected the left arm or the right arm). For example, in the case of a two-arm exercise machine, when the exercise machine is provisioned, the exercise machine includes information that its left arm is connected to a particular ball stop with a particular identifier, while its right arm is connected to a different ball stop with a different unique identifier.

As the trainer is aware of which arm a handle is connected to, the exercise machine may perform actions specific to measurements or inputs received with respect to a particular smart handle. For example, in some embodiments, the exercise machine includes two motors, where each motor is coupled to a respective handle via a respective cable. By knowing which handle is connected to which cable (which passes through a specific arm), individual motor control can be performed, where, for example, the weight on the right arm may be turned off because the user pressed a button on the handle that is connected to the right arm. This is beneficial for partner workouts as well, where each user in the partner workout is using one of the arms at the same time, and the exercise machine is able to provide individual motor control, thereby acting or behaving as two exercise machines for two different users.

As described above, the smart handles include various sensors such as IMUs, accelerometers, gyroscopes, etc. Measurements taken from the handle sensors are provided to the exercise machine. In some embodiments, the exercise machine processes and analyzes the handle sensors to perform, for example, form detection. As described above, by knowing which handle is connected to which arm, the exercise machine is able to determine, for which arm, a set of sensor measurements from the handle corresponds to. For example, each handle also has its own unique identifier. The exercise machine, upon pairing, registers the unique identifier of the handle, as well as the ball stop to which that specific handle is attached to (e.g., by the ball stop identifier, as described above). The exercise machine also knows which arm (e.g., right or left) the ball stop is attached to. Thus, the exercise machine knows the identity of the specific handle that is attached to a specific arm of the exercise machine. When sensor measurements are provided to the exercise machine, they are also associated with the identifier of the handle from which the sensor measurements originated. In this way, the exercise machine can identify whether the sensor measurements correspond to a user's left arm or right arm, where users are not necessarily symmetrical in their movements between their right and left arms. This allows for individual resolution and control at a per-arm level, as described above. For example, the exercise machine may determine that a user is weaker on one side as compared to the other, and offer spotting or assistance for the weaker side.

In some embodiments, the bond between the trainer and the smart handle is not permanent, and exists as long as the smart handle is physically connected to the exercise machine (through the ball stop on the arm of the exercise machine). For example, in some embodiments, the smart handle is automatically unpaired from the exercise machine when it is physically disconnected from the ball stop. For accessories that require multiple mating points (e.g., such as a bar, which may include two mating points), the unpairing may be performed automatically when the accessory is physically disconnected from all locking points.

The use of a physical, out of band connection or linking between the handle and the ball stop prior to pairing of the smart handle with a specific trainer ensures that an incorrect connection between a trainer and a smart handle is not made. It further prevents swapping of smart handles with different ball stops (i.e., ball stops other than the one that a smart handle is physically connected to). For example, while using a low power wireless mechanism, such as low power RFID, with a low range (e.g., six inch range), handles may still inadvertently swap ball stops when performing exercises where two handles meet together (e.g., when performing a reverse fly). When a swap occurs, the smart handles exchange which arms they are connected to, causing right to be counted as left, and left to be counted as right. Further, the use of a physical connection rather than a wireless connection prevents accidental connection to another exercise machine, which is referred to as cross-linking, where the handle becomes associated with another trainer. In such a scenario, a user turning on the weight using their handle could cause the weight to turn on for a different user. The pair-on-physical connect described herein avoids such potentially dangerous scenarios.

Another example benefit is that a simplified pairing or connection process is allowed, without requiring the user to go through a user interface and explicitly pair the exercise machine with the handle. Here, the pairing is performed automatically upon physical connection of the handle to the exercise machine via the ball stop.

In other embodiments, pairing is automatically performed based on other indications. As one example, Near-Field Communication (NFC) may be used. In this example, the handle includes an NFC antenna. The exercise machine also includes an NFC reader. The user may then take a handle (e.g., in a gym scenario) and tap it to the exercise machine. The handles are then automatically paired for the duration of their workout. When the workout is ended, the handles and the exercise machine may be automatically unpaired. This provides automated/curated experiences in terms of the user setting up in the gym. The user may also be instructed (e.g., via the exercise machine audio and/or video screen interface) to not share their handles during the duration of the workout.

Figure 13A:
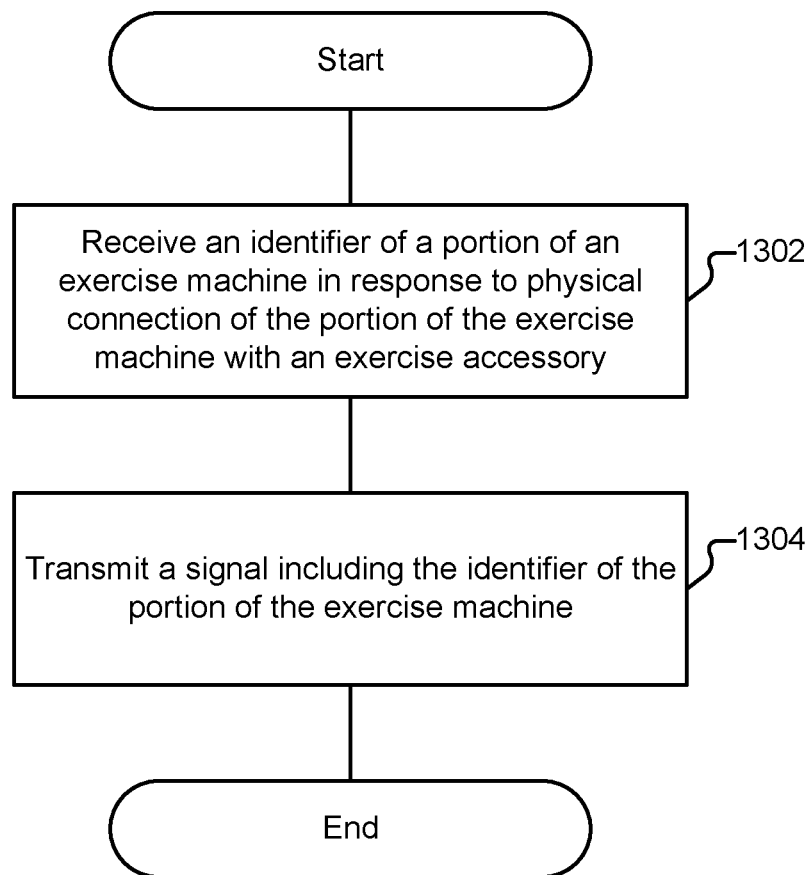
FIG. 13A is a flow diagram illustrating an embodiment of a process for pairing an exercise accessory with an exercise machine on physical connect.

FIG. 13A is a flow diagram illustrating an embodiment of a process for pairing an exercise accessory with an exercise machine on physical connect. In some embodiments, process 1300 is executed by an exercise accessory such as handle 800 of FIGS. 8A-C. The process begins at 1302 when in response to physical connection of the exercise accessory with a component or portion of an exercise machine, the exercise accessory receives an identifier of the component. An example of such a component of an exercise machine with which the exercise accessory connects is a ball stop, as described above. At 1304, the exercise accessory transmits a signal that includes the identifier of the component or portion of the exercise machine to which the exercise accessory is physically connected. The exercise machine that has the component with that identifier may then pair, link, or otherwise couple with the exercise accessory, as described above.

Figure 13B:
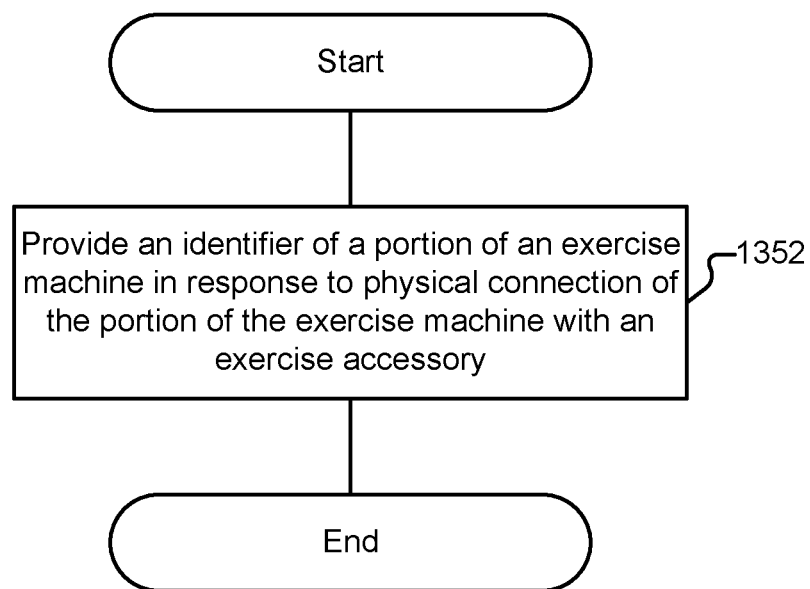
FIG. 13B is a flow diagram illustrating an embodiment of a process for pairing an exercise accessory with an exercise machine on physical connect.

FIG. 13B is a flow diagram illustrating an embodiment of a process for pairing an exercise accessory with an exercise machine on physical connect. In some embodiments, process 1350 is executed by a component or portion of an exercise machine to which an exercise accessory physically connects, such as a ball stop as described herein. The process begins at 1352 when, in response to physical connection of the exercise accessory to the component of the exercise machine, an identifier of the component or portion of the exercise machine is provided to the exercise accessory. In some embodiments, the component of the exercise machine receives power from the exercise accessory.

Bar with Dynamic Buttons

The following is an embodiment of a smart bar accessory with dynamic buttons. The smart bar accessory includes sensors along its span, such as capacitive sensing or pressure sensing. The sensors are used to determine the location or position of user's hand(s) on the bar accessory. In response to sensing or determining the location of the user's hand, a button touch zone is generated near the location of the user's hand. For example, the area an inch on the inside of the user's hand dynamically becomes a button. In some embodiments, the dynamically generated button touch zone whose placement is based on the sensed location of the user's hand(s) is indicated, for example, using a light (e.g., an LED). In some embodiments, the button zone is only activated when it is sensed that the user is gripping the handle.

Button Press Filtering

In some embodiments, filtering of button presses is facilitated. The filtering described herein is performed, for example, to filter out accidental button presses.

As described above, in some embodiments, an accessory such as a handle is paired on detection of a physical connection with the exercise machine. The exercise machine also detects when a paired accessory is not physically connected (but is still paired wirelessly, allowing for wireless communication between the accessory and the trainer). In some embodiments, when the accessory is physically disconnected, but still paired, button presses from the accessory are rejected or ignored. For an accessory that has multiple mating points, such as a bar that has locking mechanisms on both ends that connect to both arms of the example exercise machine described above, button presses are rejected or are not enabled unless both locks are secured (e.g., physical connections to both locks are sensed or detected by the exercise machine). Thus, accidental button presses that could cause, for example, weight or load to be activated (i.e., turning on of digital weight) can be avoided.

As another example, other sensor readings may be used to determine whether to ignore or reject a button press. Consider, for example, the speed of the motor providing the load or resistance. In some embodiments, if a user presses a button via the smart accessory when the motor speed is above a threshold speed, the button press is determined to be an accidental press and is ignored. In this case, the motor speed being above a threshold speed indicates that the cable is moving (e.g., because the user is adjusting their grip) and thus any button presses can safely be ignored. However, once the speed is below the threshold, the exercise machine is responsive and again listens to/permits button presses.

Detected button presses may be combined with other contemporaneous contextual sensor information (e.g., cable position, motor speed, IMU sensor readings, gyroscope, etc.) that occurred at the time of the button press to determine whether to ignore/reject or allow the button press. The type of movement to be performed, and the user's form, may also be used as contextual information to determine whether to allow a button press. For example, suppose that a user is supposed to be doing a bicep curl according to the workout being performed. If the user has proper form, then the handle shaft should be horizontal, parallel to the ground. However, suppose that the user is holding the handle in a grip as if for a hammer curl, where the handle shaft is perpendicular to the ground. This is incorrect form for the bicep curl, which the exercise machine detects based on the IMU gyroscope sensor readings (which would indicate the orientation of the handle). While in this hammer curl grip, suppose the user presses the button to turn on the digital weight or resistance. In this case, the exercise machine, in response to determining that the user's form is incorrect, rejects or ignores the request to turn on the weight, until the user has proper form. Thus, the user's form is used to determine whether to accept or reject a button press.

Time is another example of a component that may be used in determining whether to filter a button press. For example, the time since the last button press, whether from the same accessory or a different accessory paired with the exercise machine, is determined. If two button presses are close in time (e.g., within a threshold amount of time of each other), only one button press is accepted, while the other is ignored. For example, if the user is using both handles to perform a movement such as a bench press, they may unconsciously press buttons on both handles at the same time to turn on the weight. If both button presses were accepted, then the first button press would turn on the weight, while the second button press would turn off the weight and nullify the first command, which is unlikely to be what the user intended. In this case, because the two button presses occurred within a threshold amount of time, one of the button presses (e.g., the second button press) is ignored. Thus, the time of one button press in relation to another button press is used to determine whether to filter out or accept a command.

Figure 14:
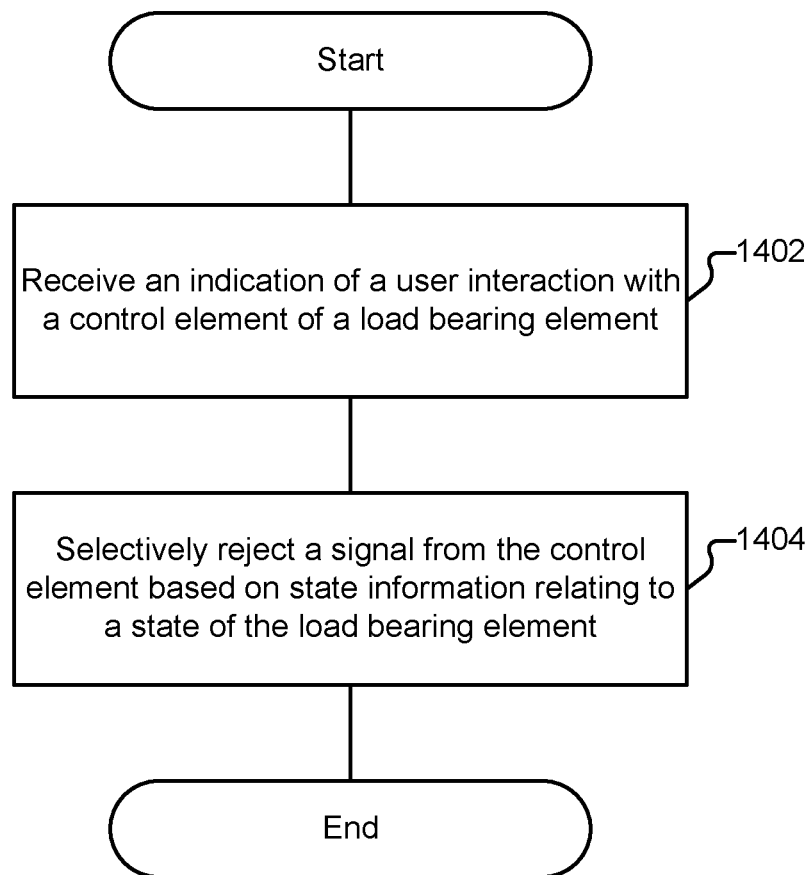
FIG. 14 is a flow diagram illustrating an embodiment of a process for filtering exercise commands.

FIG. 14 is a flow diagram illustrating an embodiment of a process for filtering exercise commands. In some embodiments, process 1400 is executed by an exercise machine and/or an exercise accessory coupled to the exercise machine. The process begins at 1402 when an indication of a user interaction with a control element of a load bearing element is received. An example of a load bearing element is the smart handle described herein. An example of the indication of the user interaction with the control element is pressing a button on the smart handle by a user. At 1404, a signal from the control element is selectively rejected based on state information relating to a state of a load bearing element. For example, if the button press corresponds to a signal to turn on or off a digital weight, the signal is selectively rejected (e.g., permitted or rejected) based on a state of the handle (e.g., whether it is physically connected to the exercise machine) or based on sensor measurements pertaining to an element such as a motor to which the handle is coupled (e.g., via a cable), as described above.

User Grip Determination

As described above, sensors in the handle may be used to determine which hand (e.g., left or right) is touching a handle. Further, capacitive sensing may be used to determine when a hand is on the grip or goblet area or both or some other portion of the handle. Described below are further details regarding hand and grip detection.

In some embodiments, the handle is designed such that a determination is able to be made of how a user is gripping the handle. For example, a user may have their hand over or under the handle when gripping it, resulting in a chirality imbalance. The difference in hand grip may be because the user is facing toward the exercise machine or away from it (which may be due to what exercise is being performed), and may change from movement to movement. The handle/exercise machine described herein may be used to determine how the user is gripping the handle (e.g., where various portions of the user's hand, such as their fingers and palm, are located on the handle when holding the handle), which may in turn be used to determine, for example, whether the user is facing the exercise machine during a workout, or facing away from the exercise machine during a workout. Further, the handle described herein allows for the exercise machine to determine which hand (right or left) a user is using to grip a particular handle. The manner in which the user is gripping the handle may also be determined.

In some embodiments, the orientation of an actuator is determined. For example, an accelerometer in the handle is used to determine the orientation of the actuator. The orientation may be determined, for example, along multiple axes (e.g., X, Y, and Z axes), In addition to the orientation of the handle, the placement of portions of the user's hand on various regions of the actuator is also sensed or detected. As one example, an array of capacitive sensors is embedded in the handle. As another example, to determine how a user is gripping the handle, a pressure sensitive gel is used, with a set of sensors to detect where pressure is being applied on the gel. For example, the pressure sensitive gel is wrapped around the shaft of the handle. The pressure sensitive gel is used to sense relative pressures along the shaft. A mapping is used to determine where on the handle there is pressure. Varying sensitivities of pressure sensitive gels may be used. As one example, the pressure sensitive mapping is binary, indicating whether there is either pressure or no pressure on a particular location of the handle.

Based on the sensor reading and mapping of where and how pressure is being applied over the surface of the handle, the exercise machine and/or handle is able to determine how the user is gripping the handle.

In some embodiments, the pattern of pressures detected along the shaft of the handle (e.g., heat map of pressures) is evaluated. For example, the pattern of pressures is used to determine the placement of one or more digits of the user. As one example, the detected pressures and their locations on what regions of the handle are used to perform thumb detection, and to determine where the thumb is placed on the handle. For example, the observed pressure map is evaluated to determine the portion of the observed pressure that corresponds to the portion of a hand that corresponds to a thumb, down through to the palm. The observed pressure map may also be used to determine the location of other digits on the handle.

As another example, suppose that the user is holding the handle in a manner such that they are making a first with their hand wrapped around the shaft of the handle. When in a first grip, the pressure for the non-thumb fingers (index finger, middle finger, ring finger, and little finger/pinkie) will stop at the same end, because the tips of the fingers are aligned and pointed in the same direction. In contrast, the pressure exerted on the handle by the thumb will stop at a different end point to the other four fingers. In this way, the thumb may be separately identified from other digits.

As yet another example, the thumb may be differentiated from a pinkie by evaluating the pressure readings for one finger with the pressure readings for an adjacent finger. For example, suppose that a finger on the outer edge of the hand has been detected. This could be either the thumb or the pinkie. If the pressure readings for this edge-most detected finger and the adjacent finger are the same (e.g., the manner in which the pressures terminate is the same), then the edge-most digit that has been detected is likely to be the pinkie. However, if the pressure readings are different, then the edge-most digit being evaluated is likely to be the user's thumb. As another example for detecting the location of a user's thumb on a handle, if, for a given digit, there is no digit detected on one side, and the adjacent digit is parallel to and in close proximity, then it is determined that the digit is a pinky. On the other hand, if the digit does not have other digits nearby, then that digit is the thumb. The orientation of a given digit versus other detected digits may also be used to detect whether the given detected digit is a thumb.

The orientation of the handle and the detected location of the thumb on the handle is then used, for example, to determine which hand (right or left) is being used to hold the handle. As described above, what handle is attached to what arm may also be determined (e.g., using the pair-on-physical connect described above). Thus, which hand of the user is on which side of the exercise machine may also be determined.

In some embodiments, the grip detection is performed locally at the handle accessory of the exercise machine. The grip detection may also be determined by the computing node in the body of the exercise machine.

Thus, as described above, in some embodiments, the exercise machine and/or handle maintains a mapping of where pressure and/or heat is detected on the handle (which indicates or corresponds to how the user is gripping the handle). In some embodiments, one or more digits of the user are detected based on the pattern of pressure and/or heat. For example, the position or location of the thumb is detected. Along with the determined orientation of the handle, the position of the thumb on the handle relative to other digits may be used to determine whether the user is holding the handle with their left or right hand.

In some embodiments, palm detection is performed to determine how the user is gripping the handle. For example, the relationship of fingers to palms is determined. In some embodiments, both digit detection and palm detection are performed, where each provides a prediction or inference of how the user is gripping a handle (e.g., with their left hand or right hand), along with a confidence in the prediction. The type of detection (digit versus palm) with the higher confidence may be used, for example. Such a hybrid approach improves the prediction of which hand is on a handle, as some movements are more reliant on the palm, while other movements are more reliant on fingers. For example, palms are used less (and would exert less detected pressure) for pulling movements, whereas fingers are used more, and where their pressure would be more easily detected. In contrast, in pushing movements, such as a bench press, more force is exerted by the palm and the thumb, and their pressures are more likely to be detected. However, the force exerted by the fingers tends to be less (and it may be more difficult to make an estimate based on finger pressure measurements).

In some embodiments, the grip prediction is augmented with additional information, such as the type of movement to be performed. For example, in some embodiments, instead of, or in addition to evaluating the orientation of the accessory, knowledge of what movement is being performed, along with the observed pressure sensitivity map is used to generate a prediction of how the user is gripping the handle (e.g., which hand is gripping the handle, the type of grip, etc.). For example, testing may be performed with users for different movements to determine, for a given movement, an expected mapping of pressure for the given movement. The expected mapping indicates, based on the real-world testing, where pressure is expected to be observed along the shaft of the handle. For example, two expected pressure mappings may be generated for the movement, one for the expected pressure mapping if a user is using their left hand to hold the handle when performing the exercise, and a second expected pressure mapping if a user is using their right hand to hold the handle when performing the exercise. When performing grip detection, the observed pressure mapping is compared against the left and/or right-hand expected pressure mappings. Based on the comparison, it is determined which hand the user is using to grip a particular handle. For example, if the observed pressure mapping for the handle matches to the expected right-hand pressure mapping, then it is determined that the user is holding the handle with their right hand. Different types of expected pressure mappings may be generated, such as for detecting a left thumb or a right thumb. For example, an expected pressure mapping may be generated that indicates the location and intensity of pressure exerted by the left thumb on a handle for a given exercise. An observed pressure mapping may be compared against the expected pressure mapping to determine whether the left thumb has been detected on a handle. The processing may be similarly performed for detecting the right thumb.

Determining which hand a user is using to grip a particular handle facilitates various other determinations. For example, the exercise machine may determine, for a given exercise, whether the right arm is stronger than the left arm. Appropriate feedback may then be provided on a per arm/hand basis.

Figure 15:
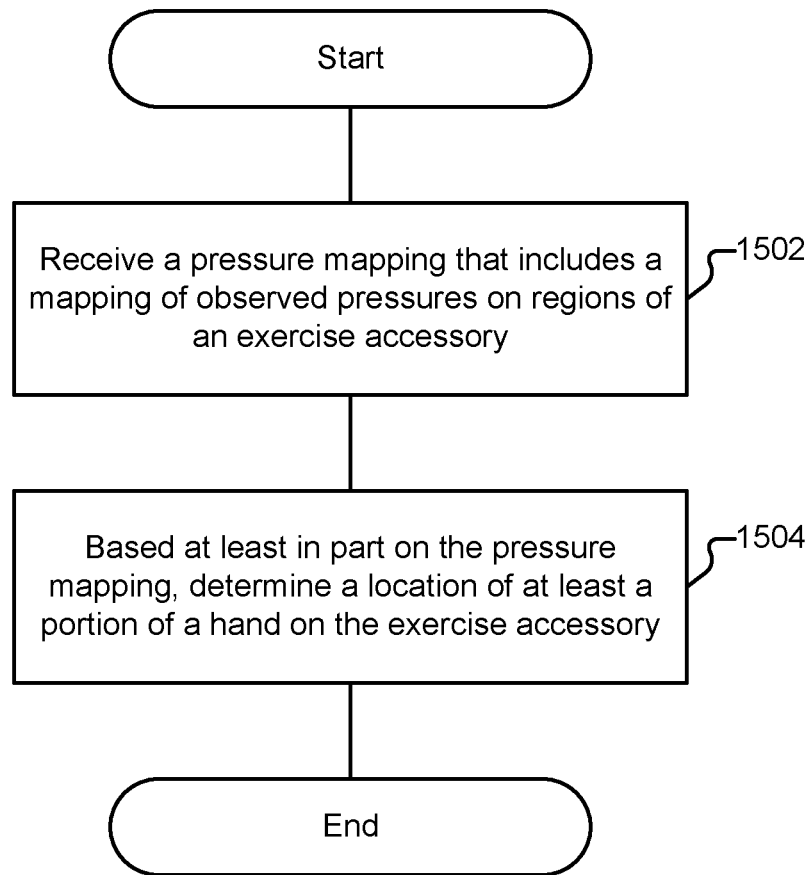
FIG. 15 is a flow diagram illustrating an embodiment of a process for detecting a grip of a user on an exercise accessory.

FIG. 15 is a flow diagram illustrating an embodiment of a process for detecting a grip of a user on an exercise accessory. In some embodiments, process 1500 is executed by an exercise machine and/or an exercise accessory coupled to the exercise machine. The process begins at 1502 when a pressure mapping is received. The pressure mapping includes a mapping of observed pressures on regions of an exercise accessory. At 1504, a location of at least a portion of a hand on the exercise accessory is determined based at least in part on the pressure mapping. The location of that portion of the hand on the exercise accessory may then be used to determine, for example, what hand a user is using to hold the handle.

Weight Control Using a Smart Accessory

In some embodiments, as described above, adjustment of the digital weight or resistance is controlled using a smart accessory such as a handle. Further example details and embodiments regarding weight control using a smart accessory are described below.

As one example, time duration of a button press on the handle may be used to enter the exercise machine into a weight changing mode. As one example, holding a button press for a threshold duration places the exercise machine in a weight change mode. While in this mode, the user may then change the weight by pulling the cable in or out. This provides an intuitive experience for the user, and allows the user to feel the varying degrees of resistance as they move the cable. This also provides safety, as the user is not suddenly loaded by a weight. Further, being able to adjust the weight from the handle itself by pulling in/out on the cable allows weight to be adjusted even while the user is on the ground or away from the frame of the exercise machine (e.g., performing an exercise such as a seated row).

In some embodiments, the exercise machine has a touchscreen, via which a weight dial is presented to the user. Via the touchscreen, the user can then rotate the rendered dial to adjust the weight up or down. In some embodiments, the handle may be used to simulate the dial, and the user is able to adjust the digital weight or resistance by rotating the handle in a similar manner as rotating the displayed weight dial on the touch screen. In some embodiments, the weight change mode is entered by the user manipulating the handle in a particular manner. This may include performing a long press of a button, pulling the cable in and out a certain number of times, double clicking a button, etc. When in the weight adjustment mode, the user adjusts the weight up or down by, for example, rotating the handle clockwise or counterclockwise. In some embodiments, a weight dial on a screen of the exercise machine also moves or updates its display in a manner corresponding to the rotation of the handle. In some embodiments, rotation of the handle to adjust the digital weight or resistance is based on determining how the user is gripping a handle (e.g., in their right or left hand), as described above (which may affect which direction of rotation is for reducing the weight, and which direction of rotation is for increasing the weight). The orientation of the handle (e.g., via IMU measurements) may be used to determine how much the weight should be adjusted.

In addition to weight, other aspects of a workout may be controlled using the handle, whether through button presses that are performed in a particular way, through manipulation of the handle in space, or a combination of both.

Edge Compute at the Handle

In some embodiments, the handle includes a processor that is configured to perform edge compute, such as of form feedback. As one example, included in the shaft of the handle is a processor such as a Cortex-M4 (other processors may be used, as appropriate). For example, the processor is included in PCB 918 (as described in conjunction with FIG. 9D) which is embedded in the shaft of the handle. For a given movement, a set of rules or conditions may be defined that are used to evaluate collected sensor measurements. Based on the sensor measurements, the set of rules determines whether the user's form is correct or incorrect. In some embodiments, at the beginning of performing a move, form feedback information (e.g., the aforementioned set of rules) is streamed from the exercise machine to the handle. As the user performs the movement, the sensor measurements made at the handle (e.g., IMU data) are processed locally according to the form feedback rules. Form detection events may then be determined locally at the device (in contrast to, for example, sending the sensor measurements to a central compute node such as a backend or a computing device in the frame of the exercise machine for processing and form detection). By only streaming, in real-time, the form feedback information pertaining to the move to be performed on an as-needed basis, memory constrained systems such as those that may be embedded in the handle are able to perform local form detection. For example, the form feedback information for all possible movements need not be sent to and stored at the smart accessory. Performing such edge compute local to the handle allows for low latency feedback, as the sensor information need not be streamed again to another location for processing.

Described above are example details and embodiments regarding a smart handle that a user holds as part of using an exercise appliance or machine. In some embodiments, the smart handle includes identification information and may also include components that may be manipulated by a user to control certain aspects of the exercise appliance. For example, a user controls the weight to be exercised upon, and/or volume of the exercise appliance acoustic information using either switches or motion detection electronics to interpret gestures made by the user. In some embodiments, the smart handles are wirelessly connected to the exercise appliance and this connection may be either passive or active.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
in response to physical connection of an exercise accessory with a portion of an exercise machine, receive an identifier of the portion of the exercise machine, wherein based on the physical connection of the exercise accessory with the portion of the exercise machine, an electrical connection is established between the exercise accessory and the portion of the exercise machine; and
transmit a signal including the identifier of the portion of the exercise machine; and
a memory coupled to the processor and configured to provide the processor with instructions.

2. The system recited in claim 1, wherein based on the signal including the received identifier of the portion of the exercise machine, the exercise accessory is paired with the exercise machine.

3. The system recited in claim 2, wherein the exercise accessory is paired with the exercise machine via a wireless pairing protocol.

4. The system recited in claim 1, wherein the exercise accessory comprises a handle.

5. The system recited in claim 1, wherein the portion of the exercise machine comprises a component of the exercise machine to which the exercise accessory is physically coupled.

6. The system recited in claim 1, wherein the portion of the exercise machine receives power from the exercise accessory via the electrical connection.

7. The system recited in claim 1, wherein the identifier of the portion of the exercise machine is received via the electrical connection.

8. The system recited in claim 1, wherein the electrical connection is provided at least in part via a conductive strap of the exercise accessory.

9. The system recited in claim 1, wherein the electrical connection is provided at least in part via a rigid conductor of the exercise accessory.

* * * * *